United States Patent [19]

Matsumoto

[11] 4,438,510
[45] Mar. 20, 1984

[54] DISK PLAYER SYSTEM HAVING A DISK SUCKING FUNCTION

[75] Inventor: Toyosaku Matsumoto, Hamamatsu, Japan

[73] Assignee: Nippon Gakki Seizo Kabushiki Kaisha, Hamamatsu, Japan

[21] Appl. No.: 301,091

[22] Filed: Sep. 10, 1981

[30] Foreign Application Priority Data

| Sep. 19, 1980 | [JP] | Japan | 55-129183 |
| Sep. 19, 1980 | [JP] | Japan | 55-132231[U] |
| Sep. 19, 1980 | [JP] | Japan | 55-132232[U] |
| Sep. 19, 1980 | [JP] | Japan | 55-132233[U] |
| Sep. 19, 1980 | [JP] | Japan | 55-132234[U] |
| Sep. 19, 1980 | [JP] | Japan | 55-132235[U] |
| Sep. 19, 1980 | [JP] | Japan | 55-132236[U] |
| Oct. 16, 1980 | [JP] | Japan | 55-147688[U] |
| Oct. 16, 1980 | [JP] | Japan | 55-147689[U] |
| Oct. 16, 1980 | [JP] | Japan | 55-147690[U] |
| Oct. 16, 1980 | [JP] | Japan | 55-147691[U] |
| Nov. 19, 1980 | [JP] | Japan | 55-165523[U] |
| Nov. 19, 1980 | [JP] | Japan | 55-165524[U] |

[51] Int. Cl.³ .................... G11B 17/00; G11B 25/04
[52] U.S. Cl. .................................... 369/271; 346/137
[58] Field of Search .................. 369/270, 271, 264; 360/86, 97, 98, 99; 346/137

[56] References Cited

U.S. PATENT DOCUMENTS 4,065,135 12/1977 Doughty ............................ 369/270
4,367,547 1/1983 Thigpen ............................ 369/271

*Primary Examiner*—Steven L. Stephan
*Attorney, Agent, or Firm*—Spensley, Horn, Jubas & Lubitz

[57] ABSTRACT

A disk player system having a disk sucking function includes a disk sucking member of a configuration defining a suction space between it and a disk and a suction channel provided for communicating the suction space with an atmosphere about a center spindle or about a peripheral portion of the disk sucking member. A suction pump provided for sucking the disk is made detachable from a turntable so that a disk sucking operation is performed before the disk is played and the suction pump is detached when the disk is played. According to the system, deterioration of quality of the reproduced signal is prevented and a sucking efficiency is improved.

23 Claims, 74 Drawing Figures

FIG. I(a)
PRIOR ART
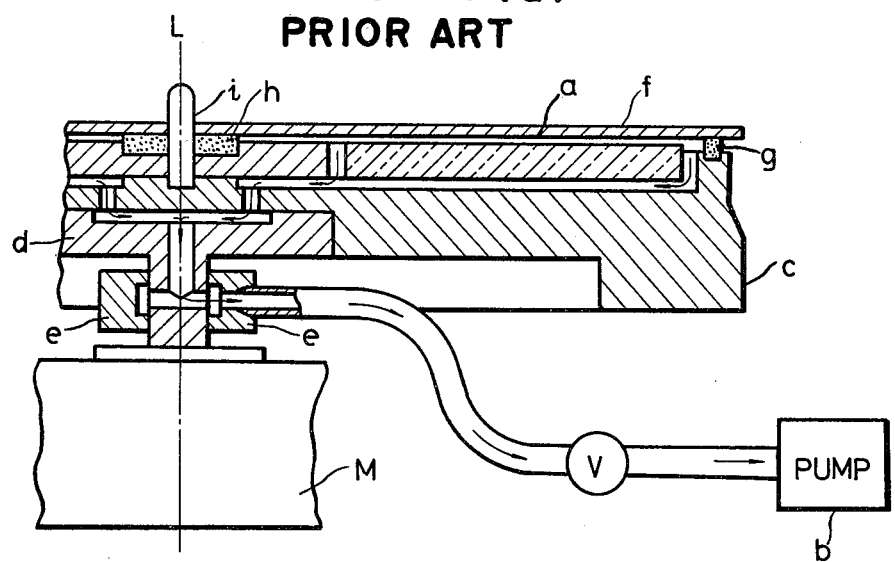
FIG. I(b)
PRIOR ART
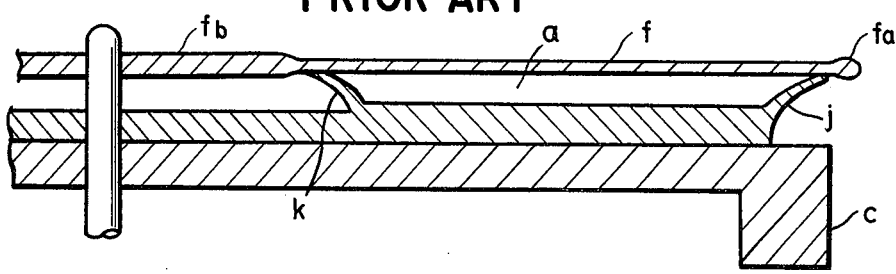
FIG. I(c)
PRIOR ART
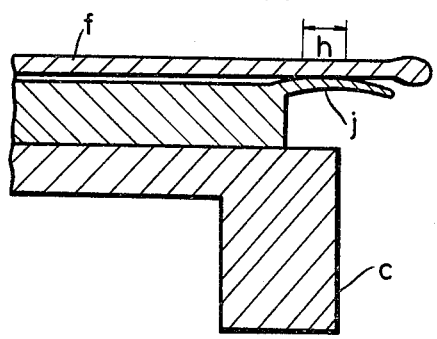
FIG. I(d)
PRIOR ART
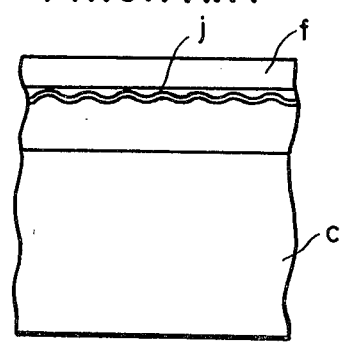

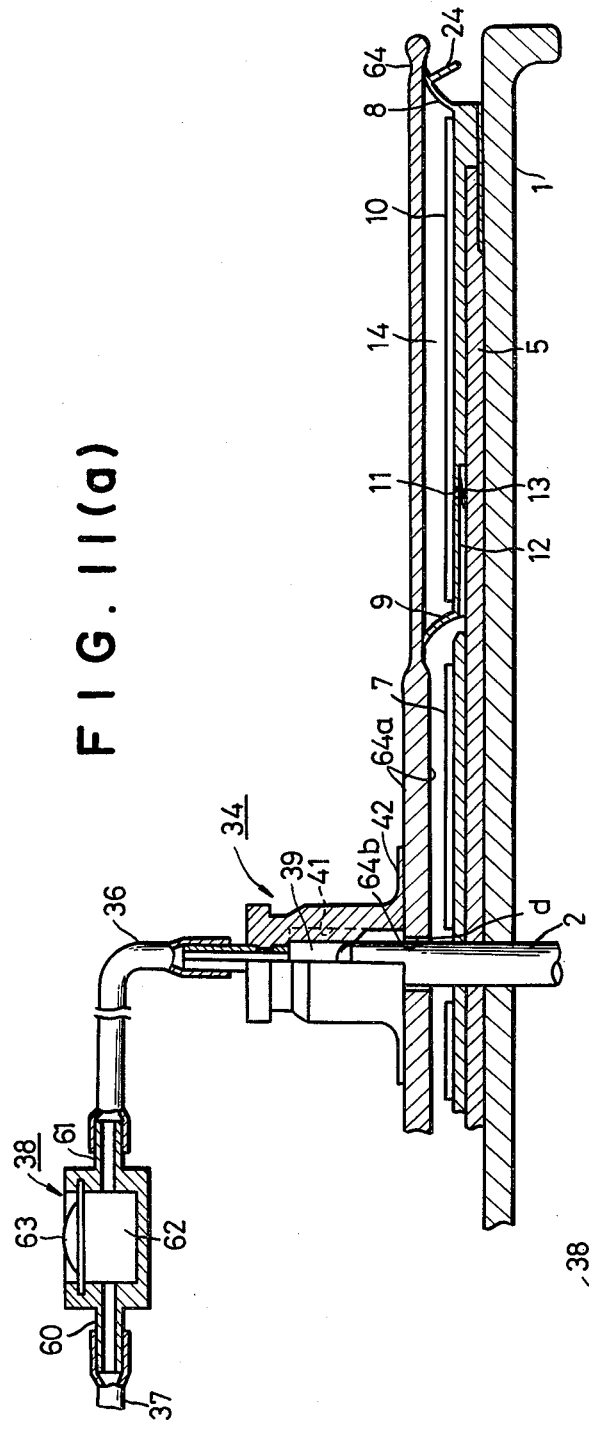
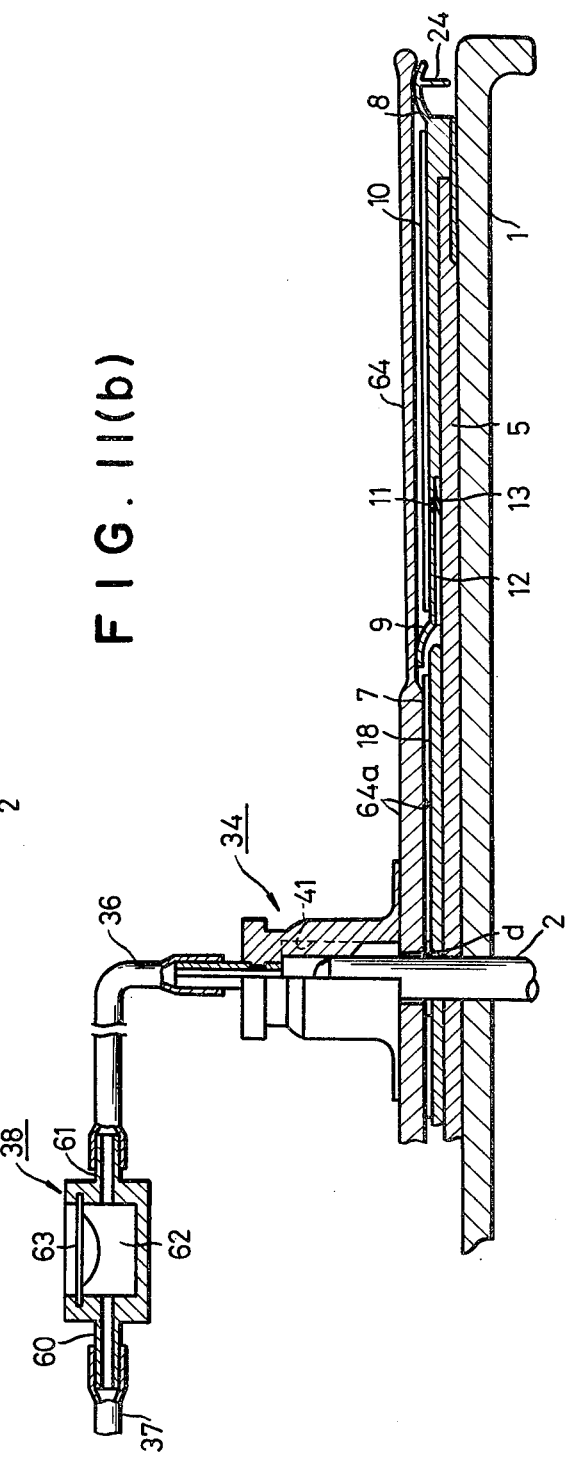

FIG. 13
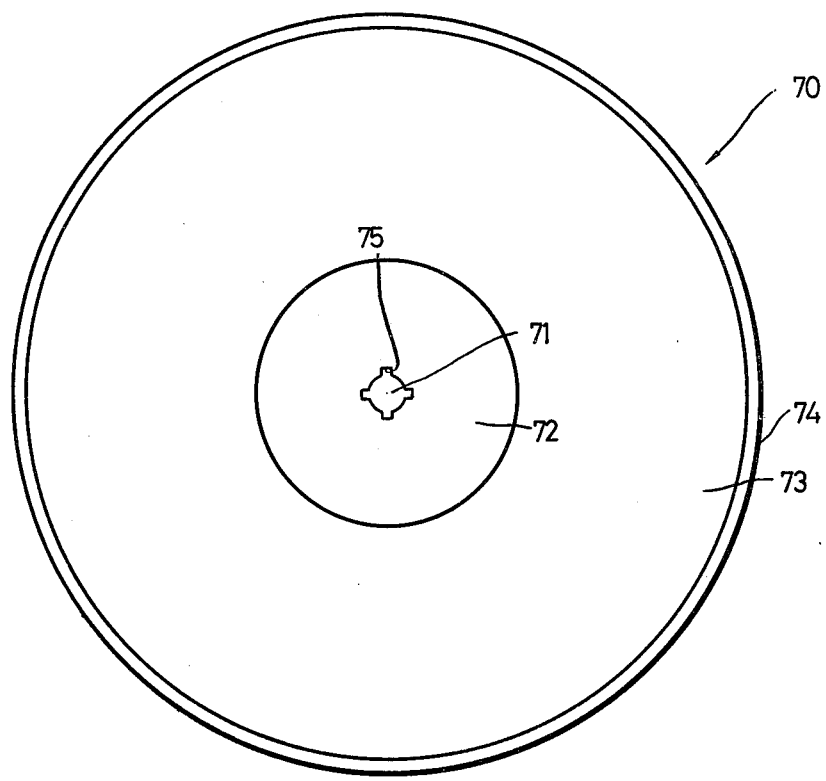
FIG.14(a)   FIG.14(b)   FIG.14(c)   FIG.14(d)
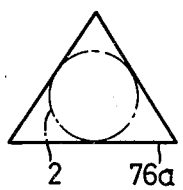 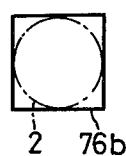 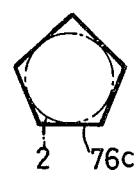 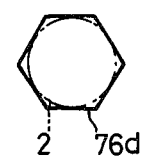

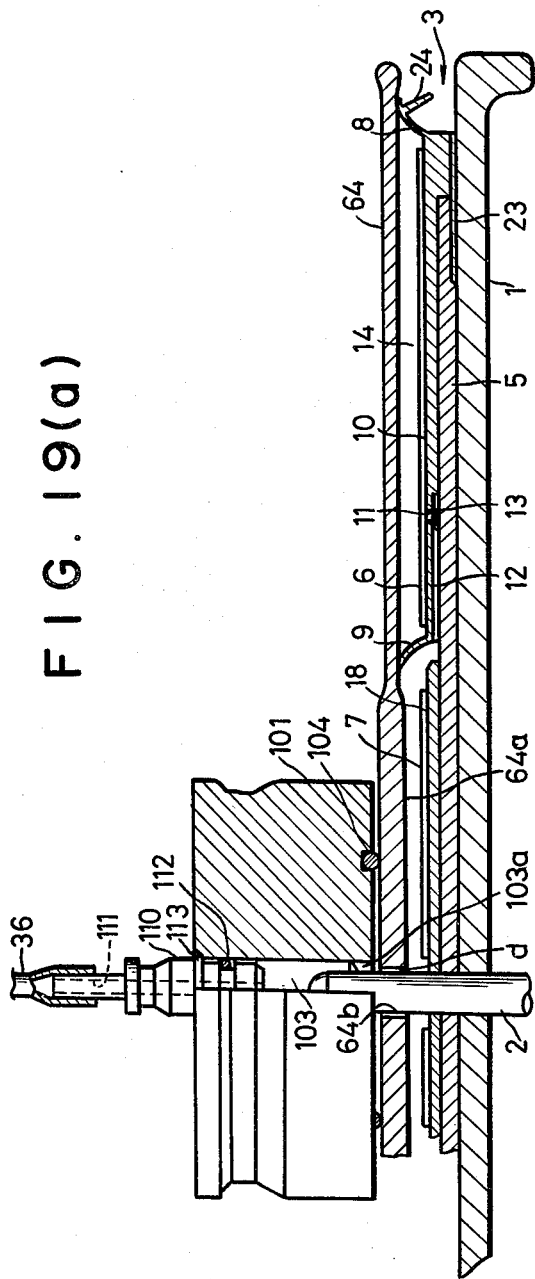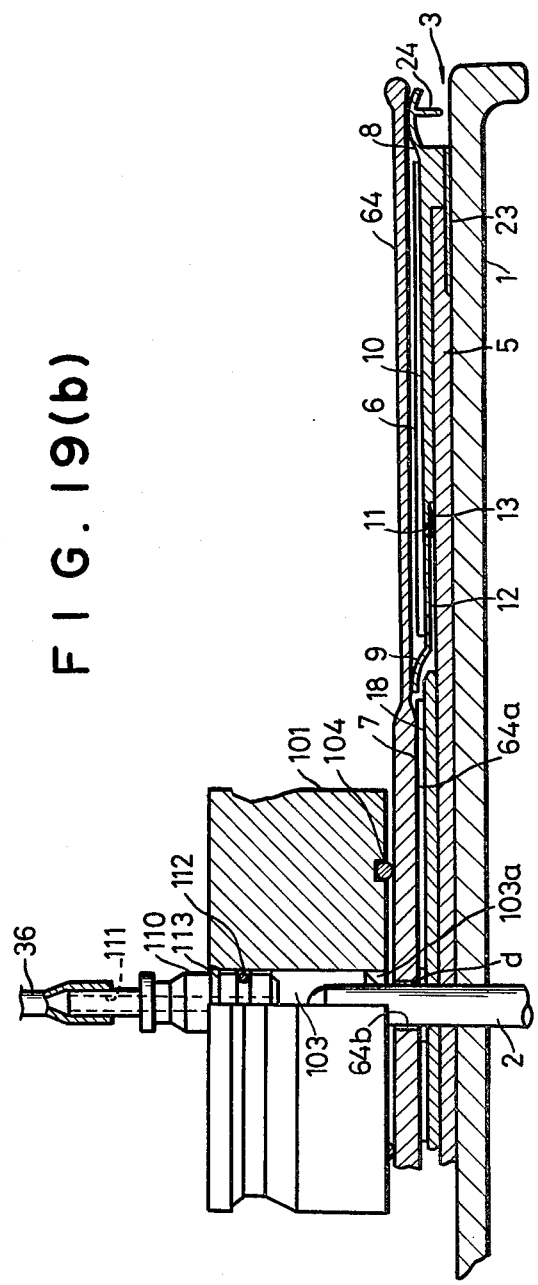

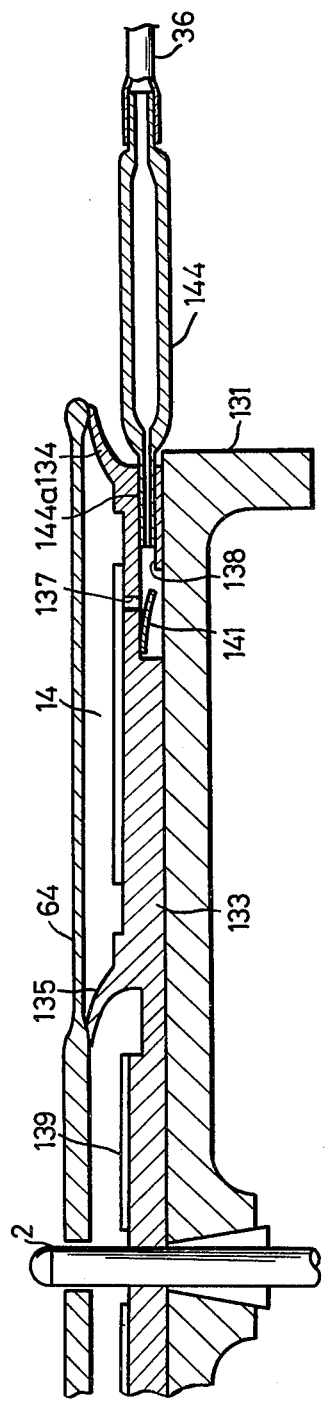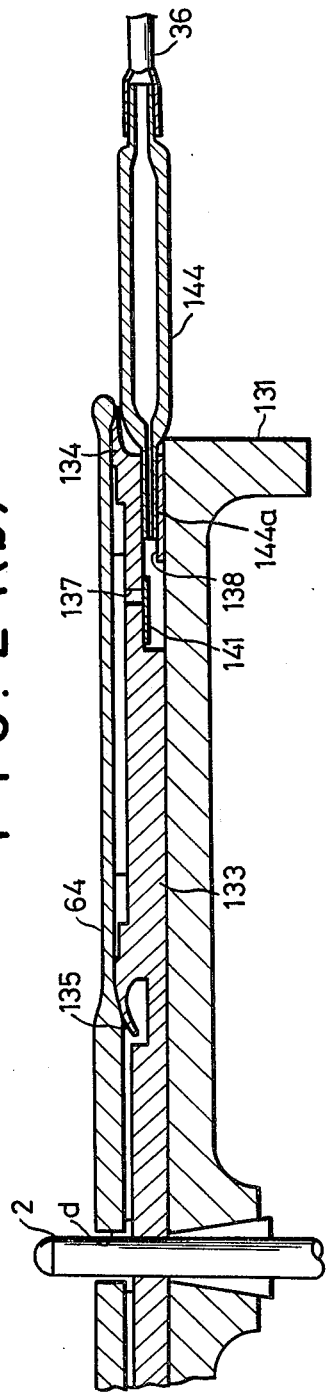

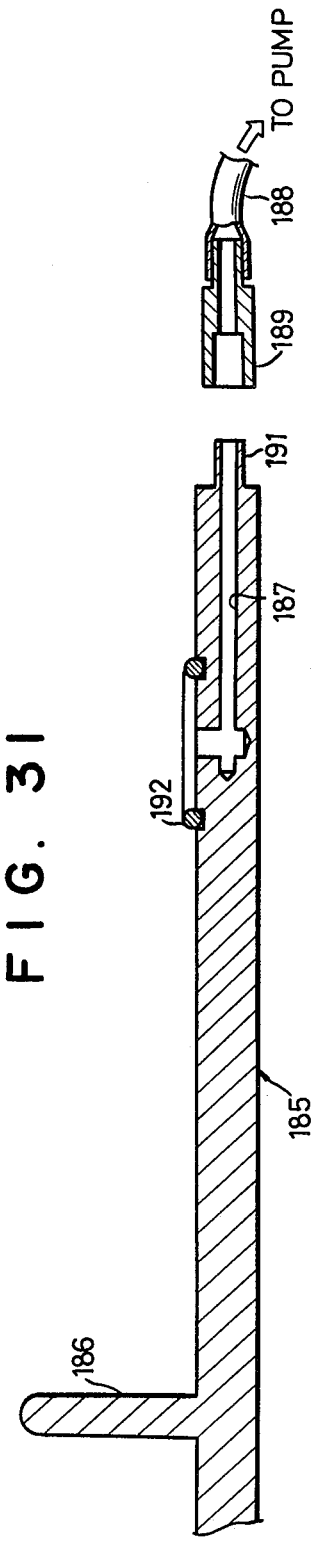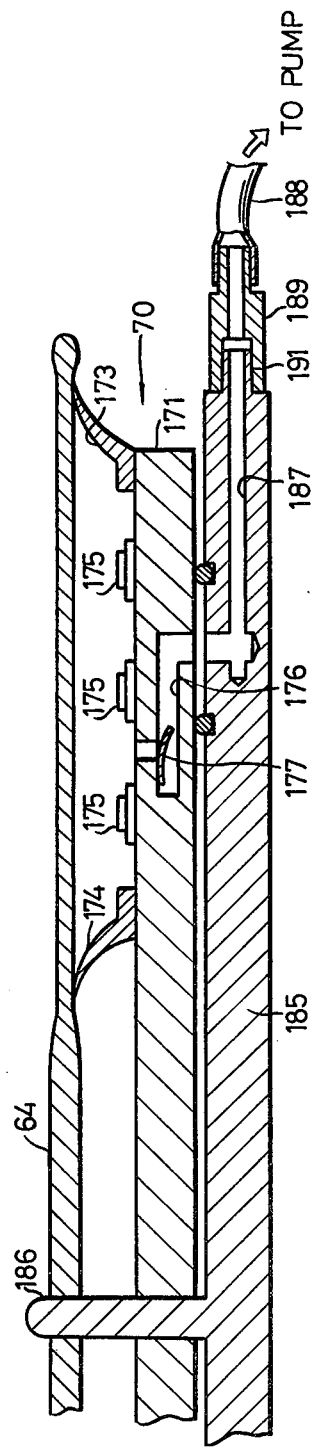

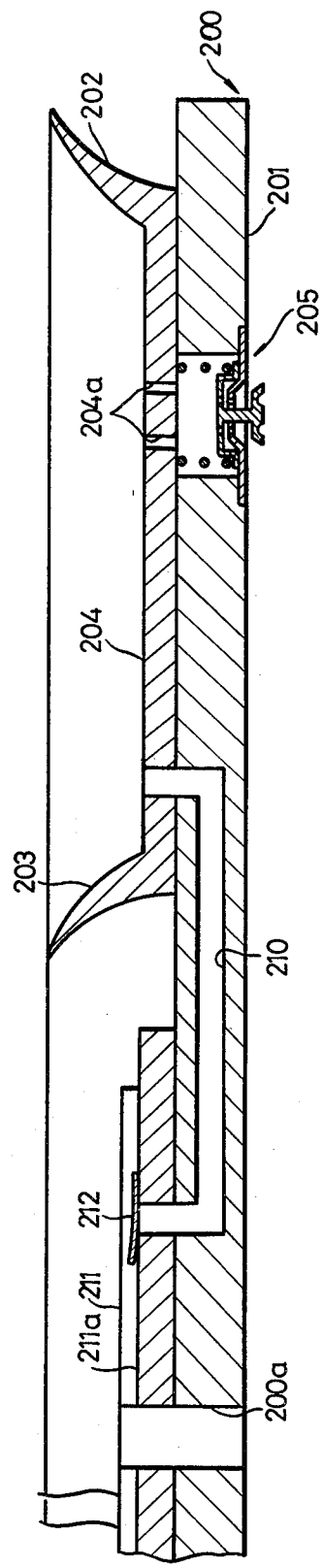
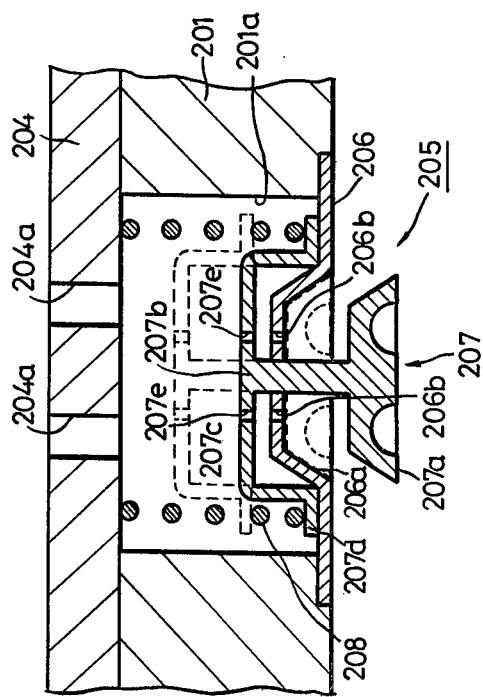
FIG. 33
FIG. 34

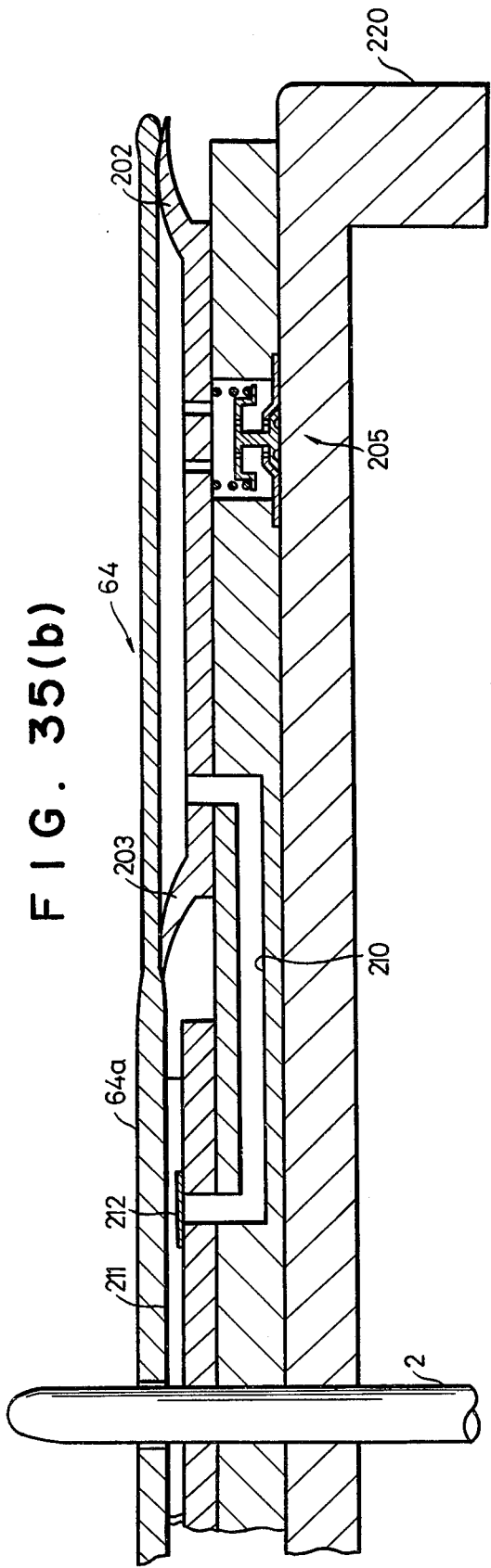
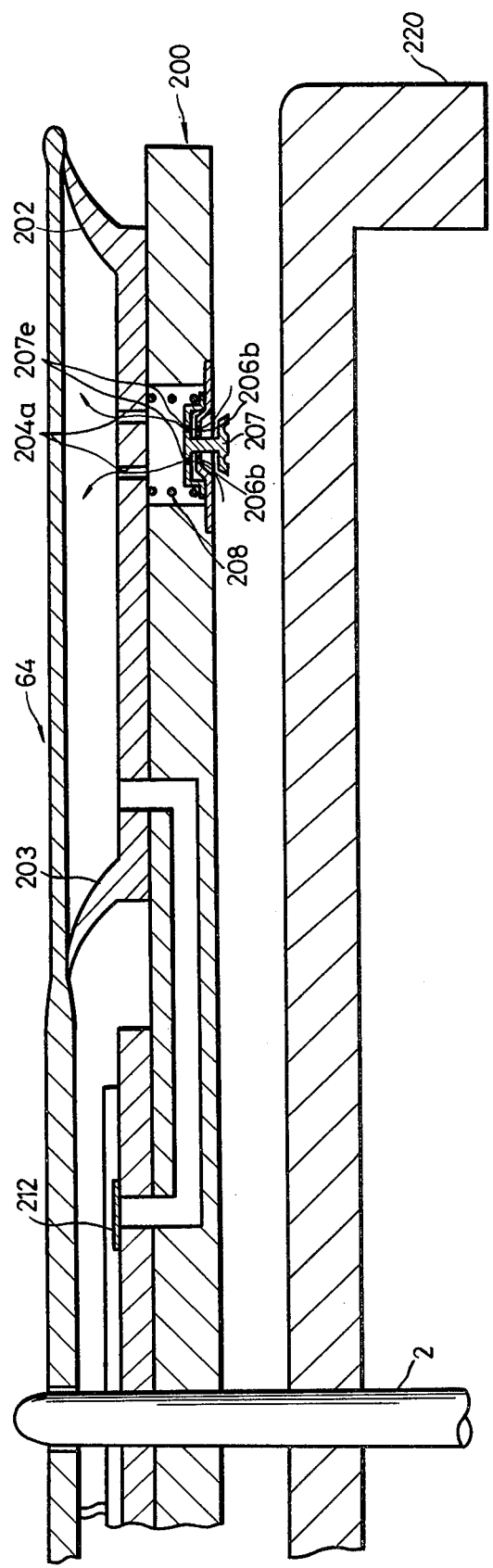

DISK PLAYER SYSTEM HAVING A DISK SUCKING FUNCTION

FIELD AND BACKGROUND OF THE INVENTION

This invention relates to a disk player system incorporating a disk sucking device which causes an information record medium in the form of a disk such as a phonograph record disk and a video disk (hereinafter referred to as "disk") to be sucked to the upper surface of a turntable of the player system by producing a state of a reduced pressure below an atmospheric pressure (hereinafter sometimes referred to as "vacuum") and utilizing this state of the reduced pressure for the sucking of the disk.

Disk sucking devices utilizing vacuum for sucking a disk to a turntable have been proposed for realizing reproduction of the disk in a desirable state in which warping of the disk is corrected by keeping the disk sucked to the turntable. FIG. 1(a) shows one of such prior art devices disclosed in the specification of U.S. Pat. No. 4,065,135. In this prior art device, a channel communicating a suction space a with a suction pump b (indicated by arrows) is provided. This channel is formed partly through a rotatable member d along an axis of rotation L of the rotatable member d and partly through a stationary member e fixed to a chassis of the player. A switching valve V is provided on the channel. When a disk f is to be reproduced, the suction space a is caused to communicate with the suction pump b by changing over of the valve V and the suction pump b is actuated to produce vacuum in the suction space a and thereby to suck the disk f to a turntable c. When the disk f is to be removed from the disk, the suction space a is caused to communicate with the atmosphere by changing over the valve V so that air is let in the suction space a. In FIG. 1, reference characters g and h designate packings, i a center spindle and M a driving motor.

The prior art disk sucking device in which the suction channel is provided in the turntable c is disadvantageous in that the device requires a complicated manufacturing process resulting in a high cost and that the device is not applicable to a turntable of an ordinary type of record reproduction system. Further, since the suction channel of this prior art device is formed through members which rotate relative to each other, sealing means must be provided between these relatively rotating members and this causes wow-flutter and adversely affects signal-to-noise ratio of reproduced signals. Furthermore, the suction channel in the prior art device is so long that sucking efficiency is rather low.

A major problem in such disk sucking divice is that air leakage makes it difficult to maintain a state in which a disk is sucked to a turntable for a long period of time. For compensating for such air leakage, the above described prior art disk sucking device employs a method according to which the suction pump b is driven each time the vacuum in the suction space a decreases beyond a predetermined degree. This method, however, requires a control system for detecting the degree of vacuum in the suction space a and driving the suction pump b in response to a detected signal. Besides, driving of the suction pump b during reproduction of the disk causes vibration which deteriorates the signal-to-noise ratio.

Another problem in such disk sucking device is to maintain an optimum degree of vacuum in the suction space. If the vacuum is too high, the disk sucked to the turntable will be injured whereas if the vacuum is too low, the disk will be disengaged from the turntable.

There has also been proposed a disk sucking device as shown in FIG. 1(b). In this device, annular lip-like seal members j and k made of rubber are provided on a turntable c in such positions as will support a disk f in portions immediately inside of a groove guard fa and immediately outside of a label fb of the disk f. By evacuating air from a space a defined by these annular seal members j and k and the disk f, the disk f is sucked toward the turntable c with the seal members j and k serving as sort of suckers and warping of the disk f thereby is corrected.

In this device, however, the periphery of the seal member j by which the disk f is sucked is liable to be bent downward to come apart from the disk f as shown in FIG. 1(c) so that the seal member j is in close contact with the disk f only in the limited portion indicated by reference character h and hence a seal thus provided is not entirely free from the air leakage. In order to enhance the sealing ability of the seal j, it could be made thinner but this would only result in a wavelike deformation of its periphery as shown in FIG. 1(d) thereby expediting the air leakage instead of reducing it. Same condition is also noted as to the seal member k.

Further, the above described prior art devices have a relatively small area for supporting the disk and this is disadvantageous in that it allows warping of the disk due to the sucking force.

SUMMARY OF THE INVENTION

It is, therefore, a primary object of the present invention to provide a disk sucking system in which a suction pump provided for sucking a disk is made detachable from a turntable structure so that a disk sucking operation is performed before the disk is reproduced and the suction pump is detached while the disk is being reproduced.

According to the invention, there is provided a disk player system having a disk sucking function comprising a turntable, means for driving said turntable, a disk sucking member of a configuration defining a suction space between said disk sucking member and a disk, means provided in said disk sucking member for defining a suction channel which communicates with said suction space at one end and with the atmosphere about a center spindle or about a peripheral portion of said disk sucking member at the other end, a check valve provided in said suction channel, and a suction device capable of being detachably connected to said turntable at about said center spindle for reducing pressure in said suction space and thereby causing said disk to be sucked to said disk sucking member, said suction device being disconnected from said turntable when said disk is reproduced.

It is another object of the invention to provide a disk sucking system eliminating an adverse effect to the turntable and preventing deterioration of quality of the reproduced signal such as signal-to-noise ratio.

It is another object of the invention to provide a disk sucking system having an improved sucking efficiency and being capable of maintaining a state in which the disk is sucked to the turntable for a sufficiently long time without occurrence of air leakage.

It is another object of the invention to provide a disk sucking system capable of maintaining an optimum pressure for sucking a disk so as to prevent injury and warping of the disk and thereby eliminate deterioration of quality of a reproduced signal.

It is another object of the invention to provide a disk sucking system in which a disk is stably supported by enlarging a disk support area.

It is another object of the invention to provide a disk sucking system in which release of a disk from suction is facilitated.

It is another object of the invention to provide a disk sucking system in which a disk sucking operation is simplified.

It is still another object of the invention to provide disk sucking system which is applicable to a conventioned type of disk playing system.

These and other objects and features of the invention will become apparent from the description made hereinbelow in conjunction with the accompanying drawings.

BRIEF DESCRIPTION OF THE DRAWINGS

In the accompanying drawings:

FIG. 1(a) is a fragmentary sectional view of a prior art disk sucking device;

FIG. 1(b) is a fragmentary sectional view of another prior art disk sucking device;

FIG. 1(c) is a fragmentary sectional view of the disk sucking device of FIG. 1(b) showing an annular lip-like seal member with a disk being sucked thereto;

FIG. 1(d) is a fragmentary elevation of the prior art device of FIG. 1(c);

FIGS. 11(a) and 11(b) are fragmentary sectional views of the turntable device shown in FIG. 2 provided with the suction device shown in FIG. 8 to conduct suction;

FIG. 13 is a top plan view of a disk formed with notches at its central opening to provide suction channels;

FIGS. 14(a) to 14(d) are top plan views showing other various disk openings;

FIGS. 19(a) and 19(b) are fragmentary sectional views of the system of FIG. 2 with the attachment of FIG. 17 mounted thereon to conduct suction;

FIGS. 24(a) and 24(b) are fragmentary sectional views of the system of FIG. 21 with the attachment of FIG. 23 being inserted therein to conduct suction of a disk;

FIG. 31 is a fragmentary sectional view of an example of the auxiliary suction device to be used with the turntable device according to the invention;

FIG. 32 is a fragmentary sectional view of the auxiliary suction device of FIG. 31 on which the disk-loaded sub-turntable shown in FIG. 28 is mounted to conduct suction of the disk;

FIG. 33 is a fragmentary section view showing an example of the sub-turntable wherein a valve device is provided to facilitate release of a disk from suction;

FIG. 34 is an enlarged sectional view of the actuator of the valve device shown in FIG. 33;

FIGS. 35(a) and 35(b) are fragmentary views of the sub-turntable of FIG. 33 with a disk being placed thereon for suction;

FIG. 36 is a fragmentary sectional view of the sub-turntable of FIG. 33 lifted to release a disk from suction;

DESCRIPTION OF PREFERRED EMBODIMENTS

Figure 2:
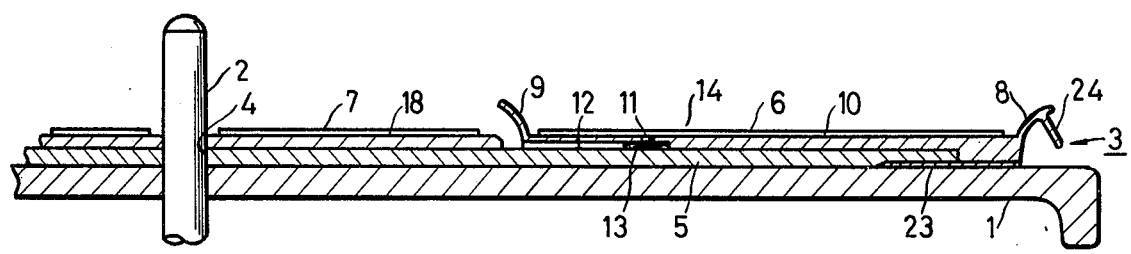
FIG. 2 is a sectional view of an embodiment of the disk sucking system according to the present invention, wherein air is withdrawn from the gap between the spindle and the central opening of a disk.

Referring first to FIG. 2, this embodiment of the invention is one in which the air is withdrawn upwardly through a gap between the periphery of a central opening of a disk and a spindle. The diameter of the central opening of the disk generally is slightly larger than the diameter of the spindle so that there is a gap, though it is a very narrow one, between the periphery of the central opening of the disk and the spindle. In the embodiment shown in FIG. 2, this gap is utilized to permit the air to be withdrawn from the space defined between the underside of the disk and the upper surface of a disk sucking member.

A spindle or a disk locating pin 2 is fixedly provided in the center of a turntable 1. A disk sucking member 3 generally is of a disk shape and can be disposed on the turntable 1 by fitting the spindle 2 into a central opening 4 of the member 3.

The disk sucking member 3 is composed of a metal sheet 5 and rubber sheets 6 and 7 rigidly attached to the metal sheet 5. The metal sheet 5 is made, e.g., of aluminium or zinc.

Figure 3:
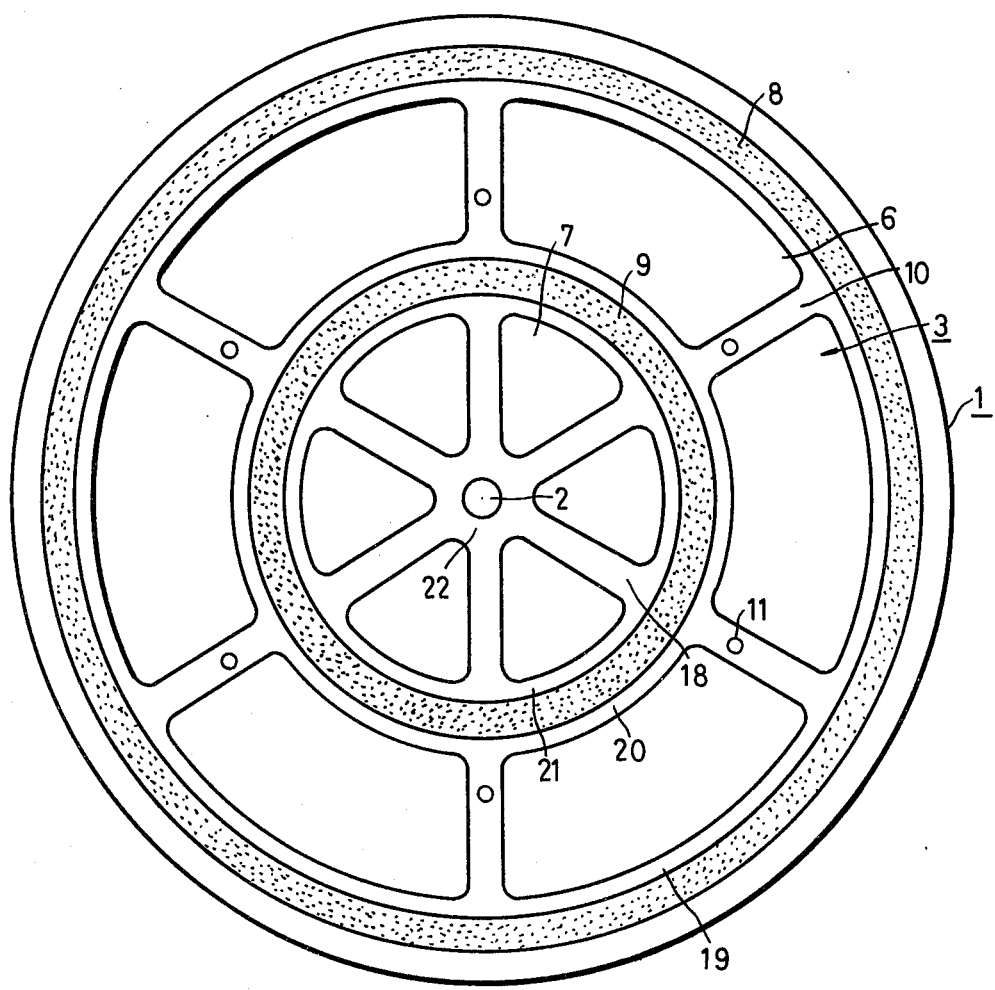
FIG. 3 is a top plan view of the embodiment shown in FIG. 2.

The outer rubber sheet 6 is provided for sucking the disk (not shown). For this purpose, the outer and inner edges of the rubber sheet 6 project upwardly to form seal portions 8 and 9. These seal portions 8 and 9 respectively are of an annular shape so that, when the disk is placed on these seal portions 8 and 9, a space defined by the seal portions 8 and 9 and the underside of the disk (hereinafter referred to as a suction space 14) becomes airtight and the seal portions 8 and 9 serve as a sucker by withdrawing the air from the suction space 14 to draw the disk toward the upper surface of the rubber sheet 6. The rubber sheet 6 is formed with radially extending grooves 10 as shown in FIG. 3. These grooves are provided to prevent occurrence of difficulty in the evacuation of the air which could result by abutting of the disk against the upper surface of the rubber sheet 6.

A suction hole 11 is formed in the botton of each groove 10. These holes 11 are communicated with a space underside of the seal portion 9 through passageways 12. The air in the suction space 14 is withdrawn through the suction holes 11 and the passageways 12.

Figure 4:
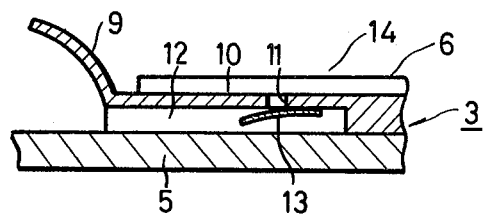
FIG. 4 is an enlarged fragmentary sectional view of the check valve shown in FIG. 2.

A check valve 13 is provided between each suction hole 11 and its corresponding passageway 12. The check valve 13 is made, as shown in FIG. 4 in an enlarged scale, of a resilient material one end of which is fixed to the underside of the rubber sheet 6 in the portion defining the passageway 12. The check valve 13 functions to open only in the direction of withdrawing the air from the suction space 14.

Figure 5:
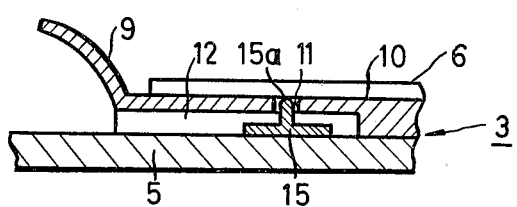
FIG. 5 is a fragmentary sectional view of a variation of the check valve shown in FIG. 2.

The check valve 13 may alternatively be composed of a projecting member 15 which, as shown in FIG. 5, is simply placed on the bottom of the passageway 12 and has a projection 15a which projects upwardly in the suction hole 11.

Figure 6:
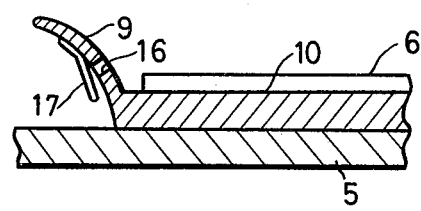
FIG. 6 is a fragmentary sectional view showing another variation of the check valve shown in FIG. 2.

The suction channel may alternatively be defined, as shown in FIG. 6, by a suction hole 16 formed in the seal portion 9 and a check valve 17 attached to the seal portion 9 in a position where the valve can open or close the suction hole 16.

Reverting to FIGS. 2 and 3, the rubber sheet 7 is formed with radially extending grooves 18. These grooves 18 are provided also to prevent occurrence of difficulty in the evacuation of the air from the suction space 14 resulting from abutment of the disk against the upper surface of the rubber sheet 7. The grooves 18 thus serve to guide the air withdrawn from the passageways 12 to the outer periphery of the spindle 2.

As shown in FIG. 3, the rubber sheet 6 is formed with annular grooves 19 and 20 in addition to the radial grooves 10 and the rubber sheet 7 with annular grooves 21 annd 22 in addition to the radial grooves 18. With all these grooves 18, 19, 20, 21 and 22, the disk can be uniformly drawn to the upper surfaces of the rubber sheets 6 and 7 in all of the underside of the disk. As shown in FIG. 2, an elastic member 23, e.g. an adhesion tape or a felt sheet, is attached to the sucking member 3 along the outer peripheral portion thereof for enabling the sucking member 3 to be seated stably on the turntable. A tab 24 projecting outwardly from the seal portion 8 is provided for releasing the air from the suction space 14 by pulling the tab 24 downardly thereby to enable the disk to be disengaged from the sucking member 3.

Figure 7:
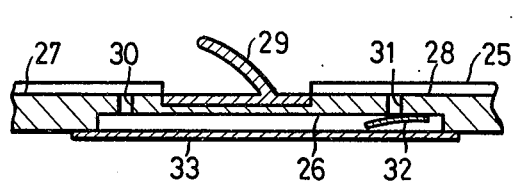
FIG. 7 is a fragmentary sectional view showing a variation of the suction passage shown in FIG. 2.

Another example of the disk sucking member 3 composed of a rubber sheet only without using a metal sheet is shown in FIG. 7. In this example, an inner annular seal 29 is buried in the upper portion of a rubber sheet 25 and a recess 26 is formed in the lower portion of the rubber sheet 25. Suction holes 30 and 31 are formed in the rubber sheet 25 to communicate inner and outer grooves 27 and 28 formed in the rubber sheet 25 with the recess 26. A check valve 32 is provided on the underside of the rubber sheet 25 so as to cover the suction hole 31. A seal 33 is provided to cover the recess 26.

Figure 8:
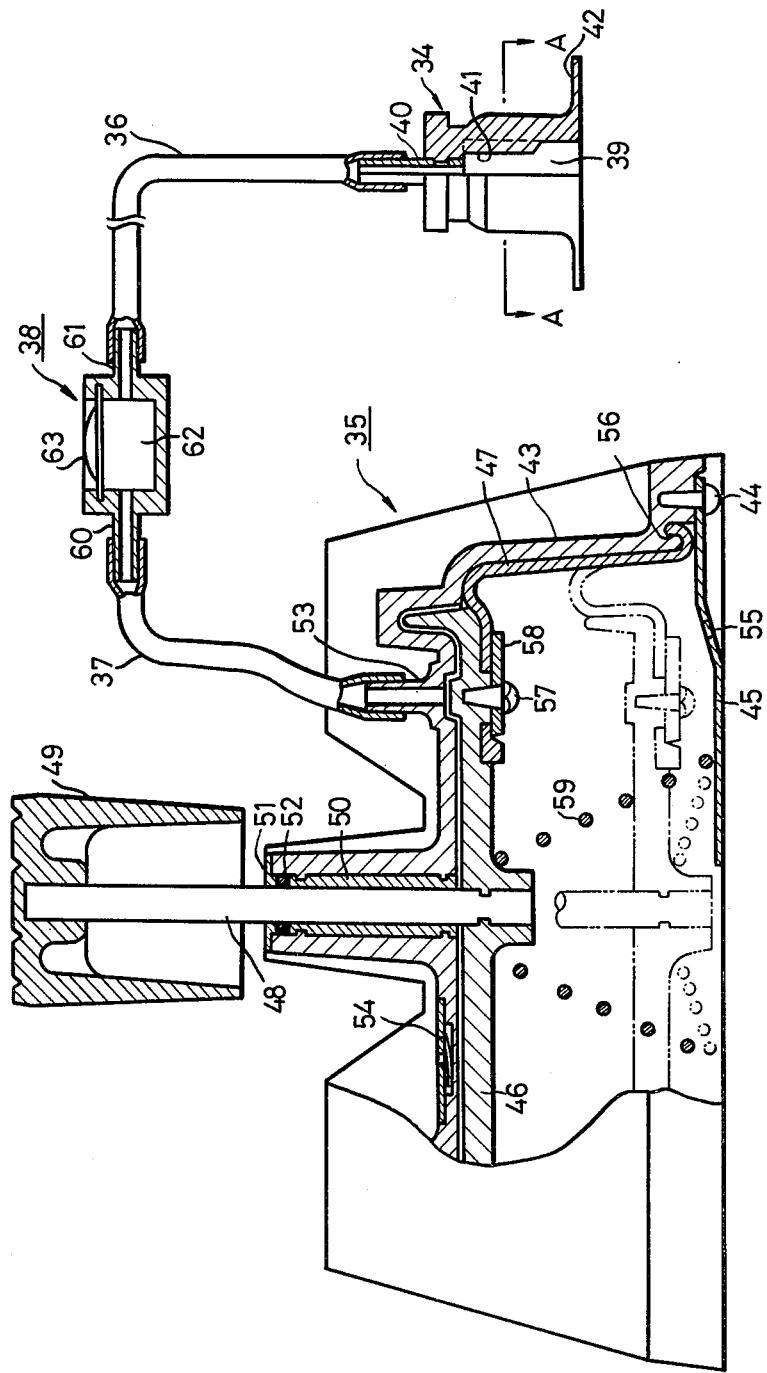
FIG. 8 is a partially sectional front view showing an embodiment of a suction device used in the invention.

FIG. 8 shows an example of a suction device for evacuating the air from the gap between the central opening of the disk and the spindle 2. The suction device includes an attachment 34 which covers the gap between the central opening of the disk and the spindle 2, a manually operated pump 35, lines 36 and 37 connecting the attachment with the pump 35 and a pressure sensor 38 provided between the lines 36 and 37.

Figure 9:
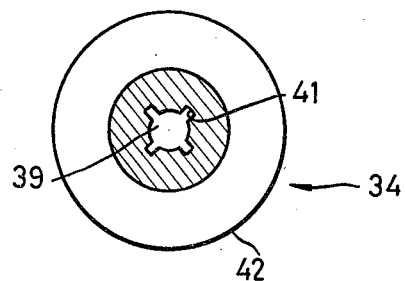
FIG. 9 is a cross-section of the attachment taken along line A—A of FIG. 8.

The attachment 34 is of a bell shape and made of an elastic material such as rubber. The attachment 34 is formed with an opening 39 which can be fitted with the spindle 2. The opening 39 is communicated with the line 36 through a connection tube 40. The attachment 34 is also formed with vertical grooves 41 adjacent to and continuous with the opening 39 for introducing the air withdrawn from the gap between the central opening of the disk and the spindle 2 to the connection tube 40. A cross section cut along lines A—A in FIG. 8 is shown in FIG. 9. The attachment 34 has a skirt portion 42 which closely engages the surface of a label portion of the disk to define a seal.

The manually operated pump 35 is provided for sucking the air from the suction space 14. The pump 35 is of a piston type and a stationary portion thereof includes a frame 43 and a bottom plate 45 fixed to the underside of the frame 43 by means of screws 44. A movable portion of the pump 35 includes a piston 46 disposed inside the frame 43, an annular rubber sheet 47 which is provided between the outer peripheral portion of the piston 46 and the lower inside portion of the frame 43 for providing a seal for a space defined by the piston 46 and the frame 43, a rod 48 fixed rigidly to the piston 46 and projecting upwardly from the central portion of the frame 43 so that the piston 46 can be moved in a vertical direction and a handle 49 attached to the upper end of the rod 48.

Seals 50 and 51 and an O-ring 52 are provided about the rod 48 to provide a seal between the rod 48 and the frame 43. An upright portion 53 is provided in the upper surface of the frame 43 to provide communication between the space defined by the upper surface of the piston 46 and the frame 43 and the line 37. A check valve 54 is provided in the upper portion of the frame which check valve 54 is opened only when the piston 46 is lifted so as to release the air from the space defined by the piston 46 and the frame 43 outside. A hole 55 is formed in the bottom plate 45 for releasing the air below 65 the piston 46. A groove 56 is formed in the lower end portion of the frame 43 to receive the lower end portion of the rubber sheet 47.

The pistion 46 is made of a suitable material, e.g. an ABS resin. The piston 46 is attached to the rubber sheet 47 by means of screws 57. Iron plates 58 are provided between the screws 58 and the rubber sheet 47 to provide sealing between the piston 46 and the rubber sheet 47.

A helical spring 59 is provided between the lower surface of the piston 46 and the bottom plate 45. This helical spring 59 urges the piston 46 upwardly.

For operating the pump 45, the handle 49 is pushed down by hand. The state of the movable portion of the pump 35 upon pushing down of the handle 49 is shown by a two-dot-chain line. In this state, the piston 46 is in its lowermost position, compressing the helical spring 59 and causing the rubber sheet 47 to bulge upwardly thereby defining the space between the pistion 46 and the frame 43. Since the check valve 54 is closed when the piston 46 is lowered, the air is introduced from the line 36 into this space. When the handle is released, the piston 46 is pushed up by the helical spring 59 and the withdrawn air is released outside of the pump 35 through the check valve 54. Thus, the evacuation operation is performed. In the embodiment shown in FIG. 8, no check valve is provided in the line 37. It should be appreciated that no reverse flow of the air takes place when the pistion 46 is raised, for the check valve 13 (FIG. 2) provided in the turntable device is closed at this time.

Figure 10:
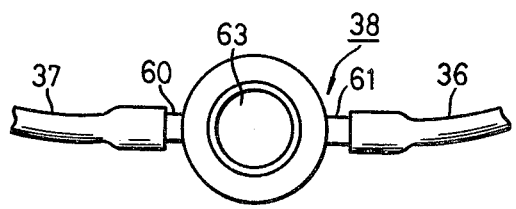
FIG. 10 is a top plan view of the pressure sensor shown in FIG. 8.

The pressure sensor 38 has couplings 60 and 61 on both sides thereof to which the lines 37 and 36 are respectively connected. The couplings 60 and 61 are communicated with each other through a chamber 62 which has an open end. A metal diaphragm 63 of a partial spherical surface shape is provided in the open end of the chamber 62. When the pressure of the air in the suction channel has dropped below a certain predetermined level by operation of the pump 35, the diaphragm 63 is inverted, making a snapping sound. This makes a signal informing the person operating the device of completion of the sucking operation, i.e., a state in which the disc is sufficiently sucked to the sucking member 3. FIG. 10 is a top plan view of the pressure sensor 38.

The sucking of the disk to the disk sucking member shown in FIG. 2 by the operation of the suction device shown in FIG. 8 is conducted in the following manner.

First, a disk 64 is placed on the turntable device as shown in FIG. 11 (a). The attachment 34 is placed on the disk 64 in such a manner that the spindle 2 is fitted with the opening 39 of the attachment 34. In this state, the disk 64 is in abutting engagement with the seal portion 8 and 9 and the skirt portion 42 of the attachment 34 is in close engagement with a label portion 64a of the disk 64. Upon operating the pump 35, the air in the suction space 14 is introduced into the space under the seal 9 through the hole 11, check valve 13 and hole 12. The air is further introduced to the space about the surface of the spindle 2 through a space defined between the inner rubber sheet 7 and the lable portion 64a of the disk 64 and then enters the attachment 34 through a gap d formed between the wall of a central opening 64b of the disk 64 and the spindle 2. The air is ultimately sucked into the pump 35 through the groove 41, line 36, pressure sensor 38 and line 37. Since the suction space 14 is interrupted from the atmosphere in this state, the pressure of the air in the suction space 14 gradually drops. The disk 64 therefore is lowered until the the label portion 64a abuts against the upper surface of the rubber sheet 7 as shown in FIG. 11 (b). Upon reaching this state, the diaphragm 63 of the pressure sensor 38 is inverted and makes a snapping sound, thereby informing completion of the sucking operation. Upon disengaging the attachment 34 from the spindle 2, the check valve 13 is closed and the disk 64 is held in a state in which it is sucked to the turntable device with the seal portions 8 and 9 serving as suckers. Reproduction of the disk 64 is then started by rotating the disk 64 in this state. For releasing the disk 64, the tab 24 is pulled down to let the outside air into the suction space 14.

In the embodiment shown in FIG. 2, a hand-operated device is employed as the suction device. Alternatively, the suction device may be composed of an automatic type structure such as one operated by the electric motor. Further, the evacuation of the air may be achieved simply by depressing the disk by hand without using the suction device shown in FIG. 8.

It should be noted that the informing of completion of the sucking operation is achieved alternatively by a display device such as a meter device, instead of above-mentioned sound information.

The above-mentioned embodiments utilizes the gap defined between the central opening of the disk and the spindle for evacuating the air. It should be appreciated, however, that the following alternatives may also be utilized.

Figure 12A:
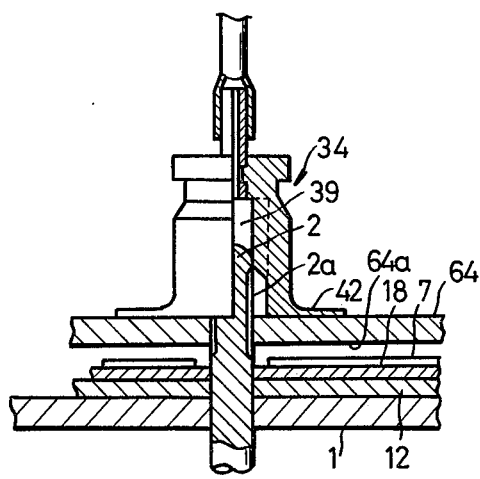
FIG. 12(a) is a fragmentary sectional view of another embodiment of the disk sucking system according to the invention, wherein the spindle is provided with suction grooves on its periphery.

(A) FIG. 12(a) shows a disk sucking system wherein a spindle 2 is formed with vertical grooves 2a at its periphery for the purpose of facilitating the evacuating of the air. Same reference numerals as in the above embodiments are used to designate similar parts and explanation thereof is omitted. The suction device as shown in FIG. 8 is utilized.

Figure 12B:
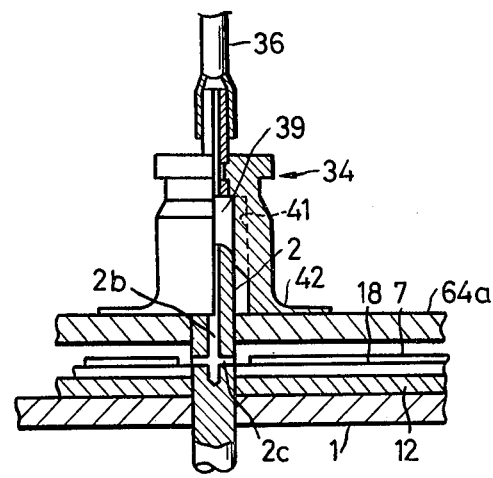
FIG. 12(b) is a fragmentary sectional view of another embodiment of the disk sucking system according to the invention, wherein the spindle is formed with suction passages therethrough.

(B) FIG. 12(b) illustrates another disk sucking system wherein passages to guide the sucked air are provided through a spindle 2 rather than on its periphery. More specifically, a passage 2b is made through the spindle 2 along its axis and communicates in the vicinity of its lower end with passages 2c formed radially through the spindle 2. The passage 2c are provided such that they can communicate with grooves 18 of a rubber sheet, i.e. on a level of an annular groove 22 adjacent the periphery of the spindle 2. The suction device as shown in FIG. 8 is also utilized. Similar parts to those of the above embodiments are also designated by same reference numerals and explanation thereof is omitted. It should be noted that the vertical grooves 41 formed on the inner wall of the attachment 34 may be omitted.

Figure 12C:
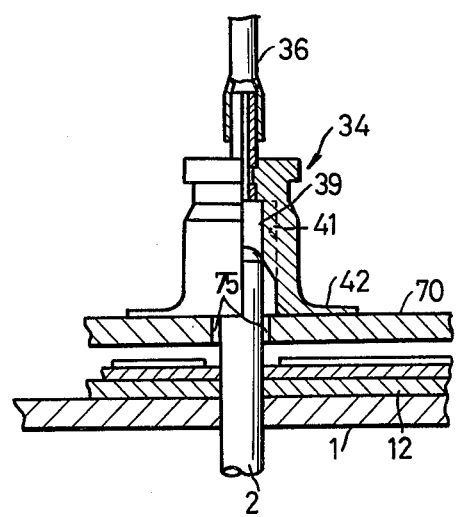
FIG. 12(c) is a fragmentary sectional view of another embodiment of the disk sucking system according to the invention, wherein the disk formed with notches at its central opening to provide suction channels is utilized.

(C) Suction channels may be alternatively provided by forming notches at a central opening of a disk as shown in FIG. 12(c) instead of on or through the spindle itself. A disk 70 shown in FIG. 13 is formed at the periphery of its central opening 71 with a plurality of notches 75 which allow space between the spindle and the central opening 71 of the disk 70 for the sucked air to pass through. Alternatively, the central opening may be formed as polygons 76a to 76d to circumscribe the spindle 2, respectively as shown in FIGS. 14(a) to 14(d). FIG. 12(c) illustrates the disk 70 shown in FIG. 13 being sucked by the disk sucking system shown in FIG. 2 using the suction device illustrated in FIG. 8. The air confined beneath the disk 70 is withdrawn into the attachment 34 of said suction device through the notches 75 of the disk 70.

Figure 12D:
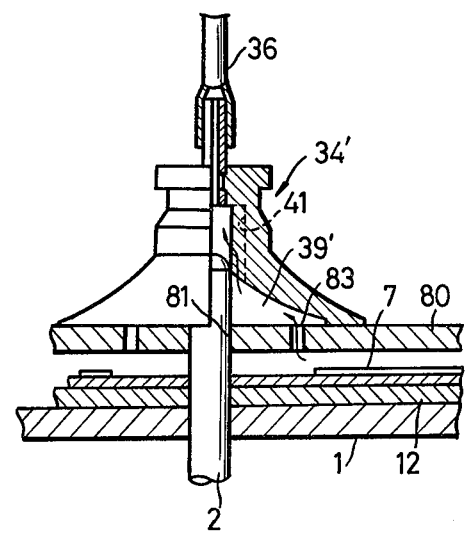
FIG. 12(d) is a fragmentary sectional view of another embodiment of the disk sucking system according to the invention, wherein the disk formed with perforations in its label portion is utilized.
Figure 15:
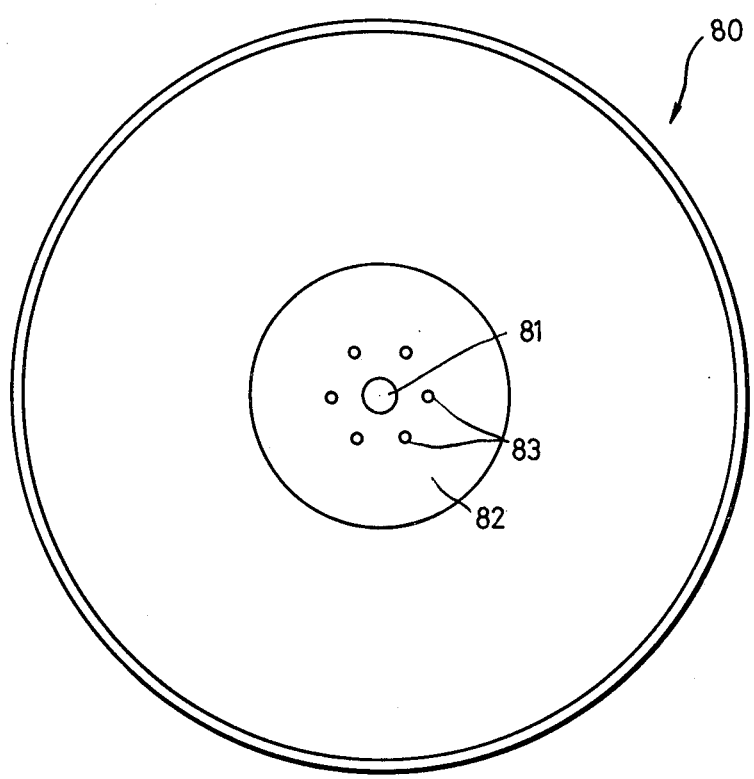
FIG. 15 is a top plan view of a disk formed with perforations in its label portion.

(D) FIG. 15 shows a disk 80 through which one or more perforations 83 are formed in its label portion 82 instead of notches provided at its central opening 81. FIG. 12(d) shows the disk 80 being sucked by the disk sucking system illustrated in FIG. 2. In this example, the annular groove 22 needs to be large enough so that the perforations 83 may not be abutted by the rubber sheet 7. The opening 39' of the attachment 34' needs to be so formed as to cover the perforations 83 overall.

Figure 16:
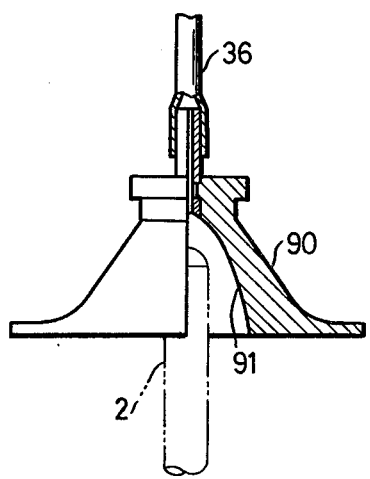
FIG. 16 is a partially sectional front view of an example of the attachment according to the invention of which the opening is not so formed as to interlock with a spindle.

The openings 39 and 39' of the attachments 34 and 34', respectively, are both so made as to fit the spindle 2 in order that the sucking operation may be performed without requiring the operator's hand pressing thereon. When, therefore, held in contact with the disk by the operator's hand, the opening of the attachment, as exemplified by an opening 91 of an attachment 90 shown in FIG. 16, does not have to be so formed as to fit the spindle 2.

Figure 17:
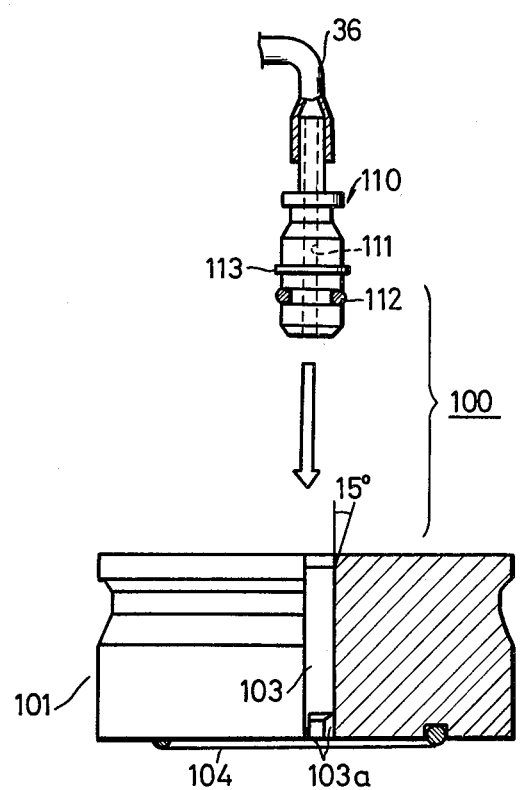
FIG. 17 is a partially sectional front view, of an example of the attachment according to the invention comprising a stabilizer.
Figure 18:
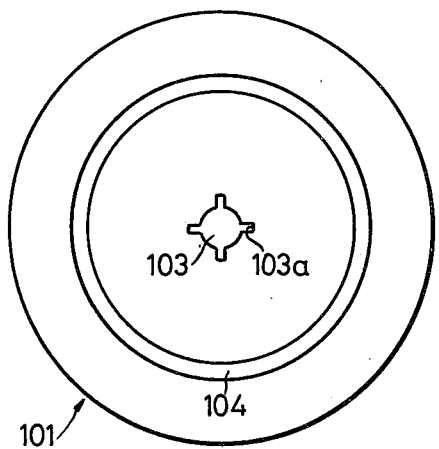
FIG. 18 is a bottom view of the stabilizer shown in FIG. 17.

Another example of the attachment of the suction device according to the invention comprises a stabilizer therein. The attachment so made is advantageous in that the weight of the stabilizer aids in sucking air from the suction space thereby facilitating the sucking operation and also serves to keep a disk sucked for a long period of time and stabilized during reproducing. Shown in FIG. 17 for example, is an attachment 100 which comprises a stabilizer 101 and a connection member 110 detachably connected to the stabilizer 101. The stabilizer 101, which is set on the disk placed on the disk sucking member aids in the sucking operation as well as serves to keep the disk stably disposed on the disk sucking member while reproduction. The stabilizer 101 is of a columnar shape and made of relatively heavy material such as brass. The stabilizer 101 is provided along its axis throughout with a passageway 103 for the spindle 2 to enter. The lower end of the passageway 103 is formed straight so as to fit the spindle 2 and is provided with vertical grooves 103a for permitting the sucked air into the passageway 103. The upper end of the passageway 103 is funnel-shaped or coned about 15 deg. to the axis so as to facilitate locating of the connection member 110 therein. The stabilizer 101 has on its bottom an O-ring 104 to secure sealed connection between the disk and the stabilizer 101. FIG. 18 is a bottom view of the stabilizer 101. The connection member 110, which is fixed at the end of the line 36, serves to connect or disconnect the line 36 to or from the stabilizer 101. More specifically, the connection member 110 is connected to the passageway 103 of the stabilizer 101 to perform the sucking operation and disconnected therefrom when the operation is completed, leaving the stabilizer 101 on the disk for stable rotation thereof during reproduction. The connection member 110 has a duct 111 formed therethrough and comprises an O-ring 112 attached thereto to ensure airtight insertion of the connection member 110 into the passageway 103 of the stabilizer 101. Further, the connection member 110 is formed with a flange 113 to rest on the coned portion provided at the upper end of the passageway 103 of the stabilizer 101.

In order to perform a sucking operation using the attachment 100 with the disk sucking system shown in FIG. 2, the disk 64 is first placed on the disk sucking member, and the stabilizer 101 is located on the disk 64 by the spindle 2, as shown in FIG. 19(a), causing the disk 64 to be depressed by the weight of the stabilizer 101. As a result, the air in the suction space 14 is forced out toward the space under the seal portion 9 through the hole 11, check valve 13 and passage 12. The air is then introduced to the space about the surface of the spindle 2 through the space defined between the inner rubber sheet 7 and the label portion 64a of the disk 64 and then reaches the bottom of the stabilizer 101 through the gap d allowed between the wall of the central opening 64b of the disk 64 and the spindle 2. The air then passes through the grooves 103a and the passageway 103 to be finally let out into the atmosphere. The connection member 110 is now inserted into the passageway 103 of the stabilizer 101 and a manual pump such as shown in FIG. 8 (not shown) is operated. By operating the pump, air is further withdrawn from the suction space 14 and introduced, after running through said suction channel, into the pump through the duct 111 of the connection member 110 and line 36. This causes the disk 64 to be lowered until the label portion 64a abuts the upper surface of the rubber sheet 7 as shown in FIG. 19(b). Upon detaching the conection member 110 from the stabilizer 101, the check valve 13 is closed to allow the disk 64 to remain sucked to the turntable device with the seal portions 8 and 9 serving as suckers. Reproduction of the disk 64 is then started by rotating it with the stabilizer 101 serving to ensure stable rotation of the disk 64. For releasing the disk 64, the stabilizer 101 is removed and the tab 24 is pulled down to let the outside air into the suction space 14. The grooves 103a made at the passageway 103 of the stabilizer 101 may be dispensed with by alternatively providing a suction channel on or through the spindle 2 as shown in FIG. 12(a) or 12(b).

Figure 20:
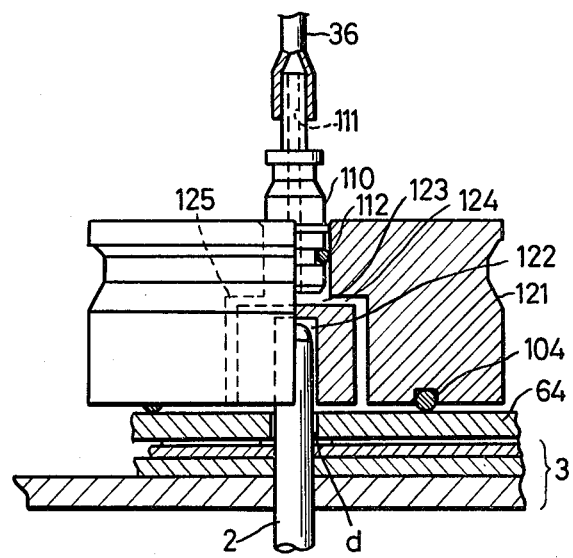
FIG. 20 is a partially sectional front view of a variation of the stabilizer shown in FIG. 17.

While the passageway 103 of the stabilizer 101 establishes direct communication between its lower end to receive the spindle 2 and its upper end to engage the connection member 110, a suction channel through the stabilizer may be otherwise provided as illustrated in FIG. 20, wherein a stabilizer 121 is formed with a hole 122 to receive the spindle 2, a separately provided opening 123 to locate the connection member 110 and passages 124 and 125 joining the opening 123 from below inside the O-ring 104.

Figure 21:
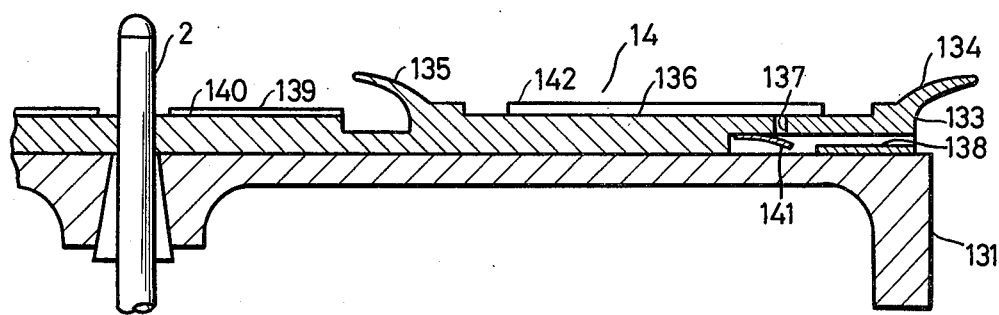
FIG. 21 is a fragmentary sectional view of another embodiment of the disk sucking system according to the invention, wherein air is finally sucked from the periphery thereof.

In all of the embodiments described above, the air evacuated from the suction space is sucked from above the turntable but it may be sucked from the periphery of the turntable, as exemplified in FIG. 21, with a suction channel as simple as in the preceding embodiments.

Figure 22:
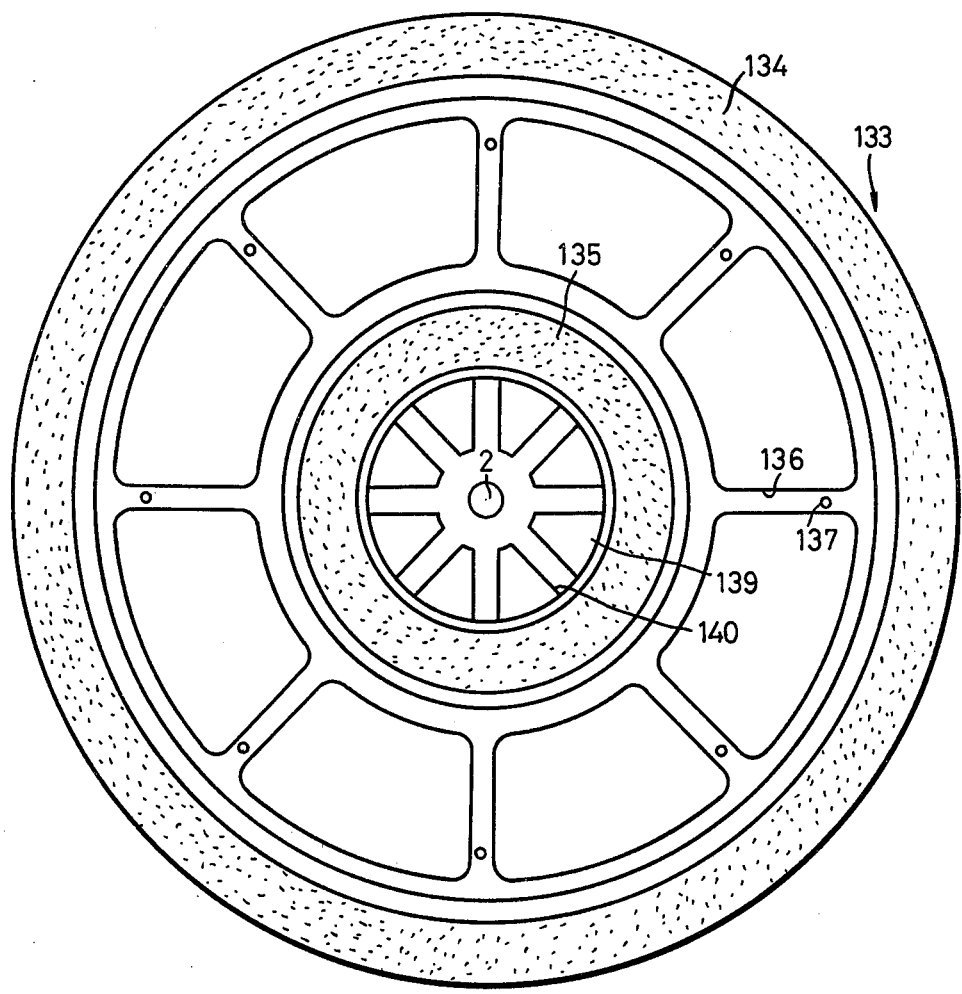
FIG. 22 is a top plan view of the system shown in FIG. 21.
Figure 23:
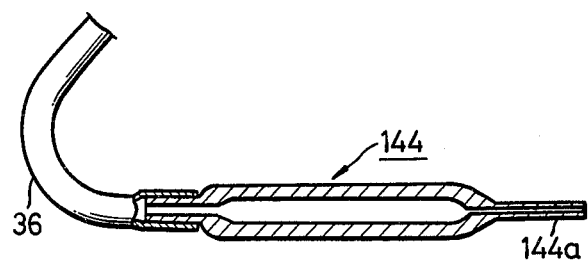
FIG. 23 is a sectional view showing an example of the attachment to be used with the system shown in FIG. 21.

The disk sucking system shown in FIG. 21 comprises a turntable 131 and a sub-turntable 133 mounted thereon. The sub-turntable 133 has, on its upper surface, annular soft rubber seal portions 134 and 135 which support a portion immediately inside of the groove guard of a disk (not shown) and immediately outside of the label portion, respectively. A sheet 142 is formed with radially extending grooves 136 so as to prevent occurrence of difficulty in the evacuation of the air which could result by abutting of the disk against the upper surface of the sheet 142. A suction space 14 communicates with the atmosphere by an opening 137 made in each of the grooves 136 and by a passage 138 opening at the periphery of the subturntable 133. A check valve 141 is provided between each suction opening 137 and its corresponding passage 138. While a disk is sucked, the check valve 141 is closed to prevent air from flowing back into the suction space 14. An inner sheet 139 of the sub-turntable 133, against which the label portion of the disk abuts, is formed with radially extending grooves 140. FIG. 22 is a top plan view of the turntable device shown in FIG. 21. FIG. 23 illustrates an attachment 144 to be used with the disk sucking system shown in FIG. 21. The attachment 144 is of a pipe structure and has a narrow end 144a to be inserted into the passage 138 of the sub-turntable 133. FIG. 24(a) illustrates the attachment 144 with the end 144a inserted in the passageway 138 of the sub-turntable 133 on which a disk 64 is placed. Upon operating a suction pump such as shown in FIG. 8 (not shown), the air in the suction space 14 is introduced into the pump through the opening 137, check valve 141, passageway 138 and thence through attachment 144 and line 36. Since the suction space 14 is interrupted from the atmosphere, the pressure of the air in the suction space 14 gradually drops. The disk 145 therefore is lowered and remains sucked as shown in FIG. 24(b) while the air in the space below the label portion is let out through the gap d between the spindle 2 and the central opening of the disk 64. Upon pulling out the attachment 144 from the disk, the check valve 141 is closed to allow the disk 64 to stay sucked to the disk sucking system with the seal portions 134 and 135 serving as suckers. Reproduction of the disk 64 is then started by rotating the disk 64 in this state.

Figure 25:
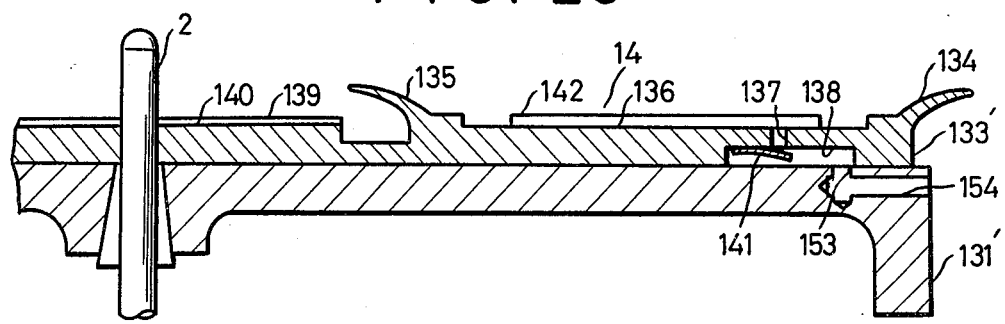
FIG. 25 is a fragmentary sectional view of another embodiment of the disk sucking system according to the invention wherein air is sucked finally from the periphery thereof.
Figure 26:
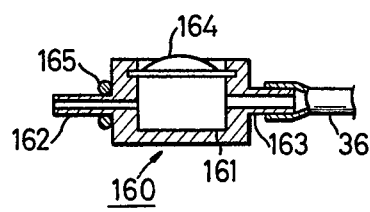
FIG. 26 is a sectional view of an example of the attachment to be used with the turntable device of FIG. 25.
Figure 27:
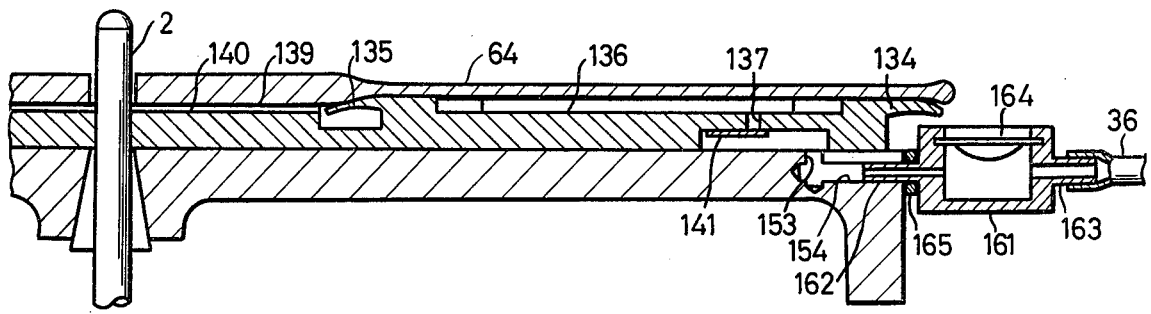
FIG. 27 is a fragmentary sectional view of the system of FIG. 25 with the attachment of FIG. 26 being inserted therein to conduct suction of a disk.

FIG. 25 illustrates another embodiment of the disk sucking system according to the invention, which is provided with a passage opening at the periphery of the turntable. In FIG. 25, where the same reference numerals as used in FIG. 24 indicates the corresponding parts, a turntable 131' is provided with an opening 153 which establishes communication between a passageway 138' formed in a sub-turntable 133' and a passage 154 formed in the turntable 131'. The passage 154 opens at the periphery of the turntable 131' to communicate with the atmosphere. FIG. 26 shows an attachment 160 or a pressure sensor to be used with the embodiment illustrated in FIG. 25. The attachment 160 has couplings 162 and 163 on both sides thereof. The coupling 163 communicates with a suction pump (not shown) by a line 36 while the coupling 162 has an O-ring 165 about it for sealing. A chamber 161 has an open end wherein is provided a metal diaphragm 164 of a partial spherical surface shape. In order to conduct the sucking of a disk 64, the coupling 162 of the attachment 160 is inserted in the passage 154 of the turntable 131' and the suction pump is operated. When the suction has been fully conducted the diaphragm 164 of the attachment 160 is inverted as shown in FIG. 27 and makes a snapping sound, thereby informing completion of the sucking operation.

While in all of the preceding embodiments, the sucking operation is performed with a suction seat mounted on a turntable, it may be alternatively conducted by first having a disk sucked to a suction seat separately provided from a turntable, thereafter removably placing the disk-loaded suction seat or sub-turntable on the turntable for reproduction of the disk, said sub-turntable being of a disk shape made of a sturdy material and formed with a suction channel therein which provides communication between the suction spaced defined above the upper surface of the sub-turntable and the underside or periphery thereof with a check valve provided halfway.

Figure 28:
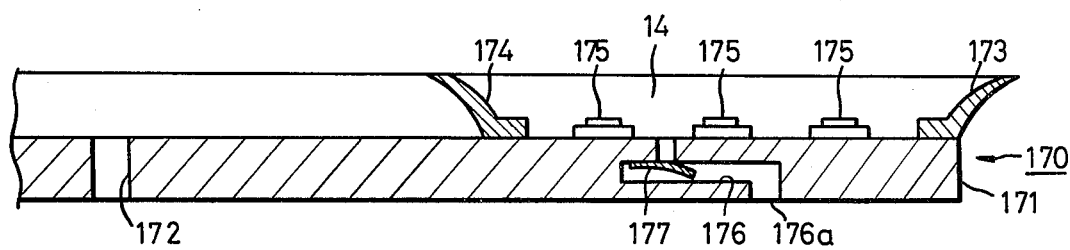
FIG. 28 is a fragmentary sectional view showing an example of the sub-turntable of a type which is detachably mounted on a main turntable.
Figure 29:
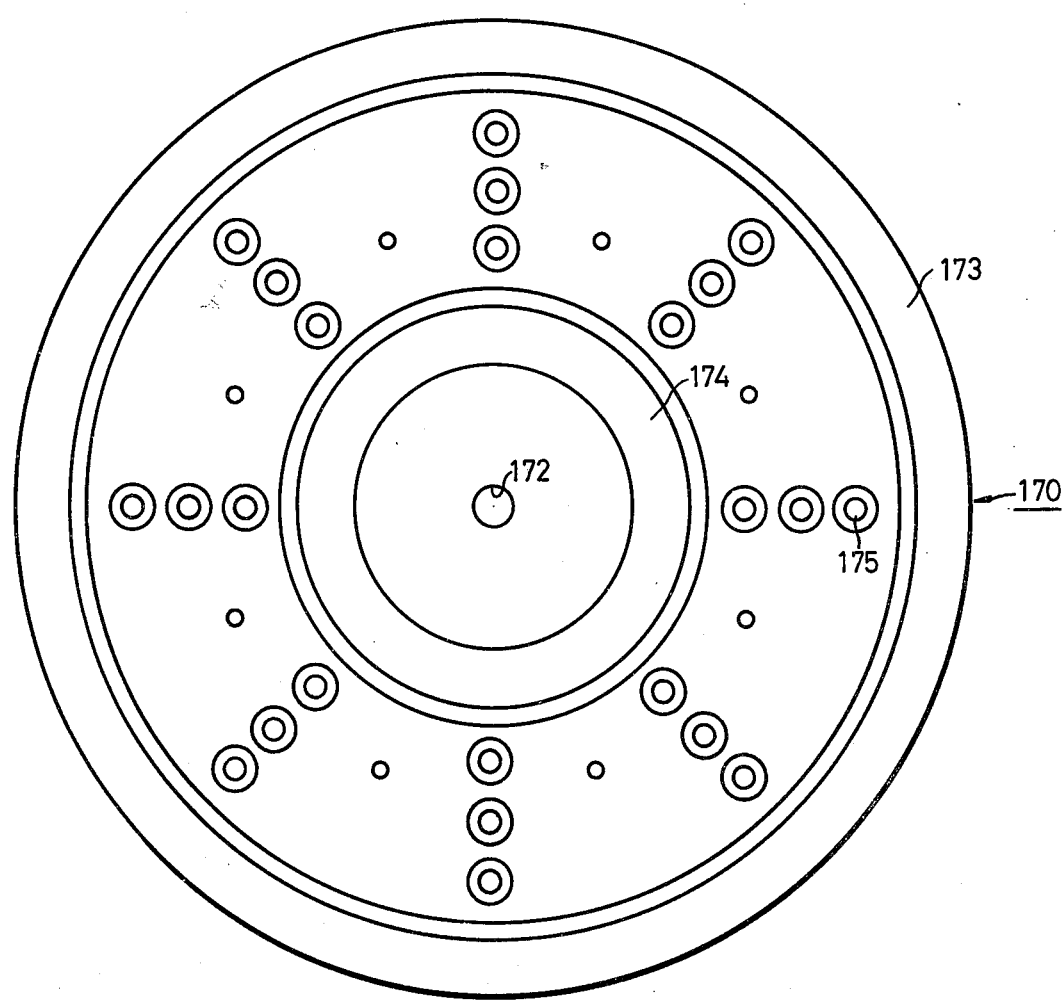
FIG. 29 is a top plan view of the sub-turntable shown in FIG. 28.
Figure 30A:
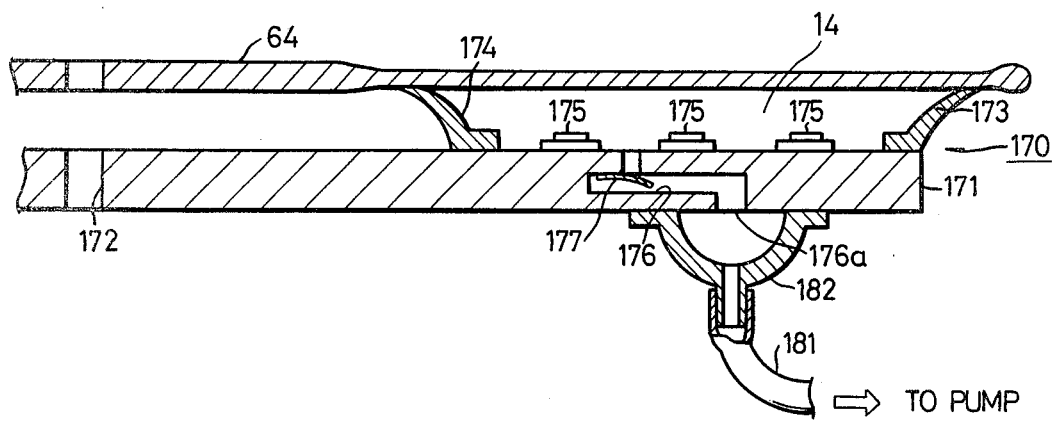
FIGS. 30(a) to 30(c) are sectional views of the sub-turntable shown in FIG. 28 with a disk place thereon to be sucked.
Figure 30B:
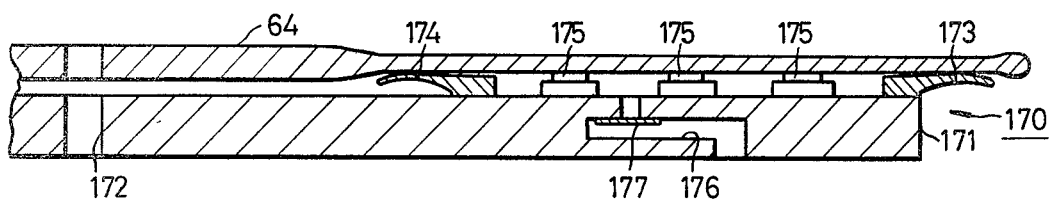
Figure 30C:
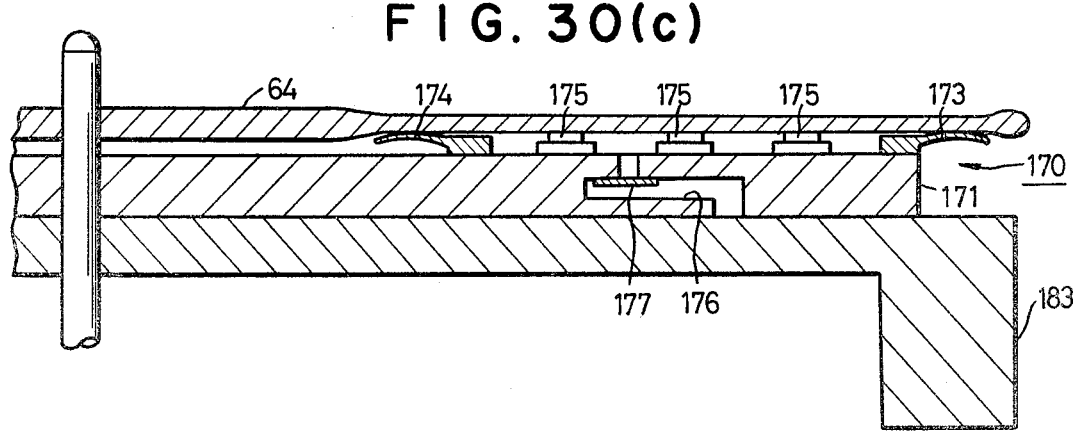

Referring, for example, to FIG. 28, a sub-turntable 171 of a suction device 170 is of a disk shape made of a sturdy material such as aluminum. A disk is sucked onto the sub-turntable 171 which in turn is mounted on a turntable (not shown). The sub-turntable 171 has a central opening 172 for a center spindle to enter. On the upper surface of the sub-turntable 171 are fixedly attached liplike rubber seals 173 and 174 which respectively abut the portions immediately inside of the groove guard of a disk and immediately outside of the label portion. These seals 173 and 174 act as suckers to draw a disk. On the upper surface of the sub-turntable 171 are provided rubber abutments 175 arranged between the seals 173 and 174 at regular intervals annularly and radially. These abutments 175 serve to support the underside of the disk as it is sucked so that the disk may not be warped by low pressure in the suction space 14 caused by evacuation of air. The sub-turntable 171 is formed with a passage 176 to provide communication between the upper surface surrounded by the seals 173, 174 and the underside of the sub-turntable 171. The passage 176 is provided to discharge the air withdrawn from the suction space 14 defined between the disk and the upper surface of the sub-turntable 171 and sealed by seals 173 and 174. A check valve 177 is provided in the passage 176 to prevent air from flowing into the suction space 14 from an aperture 176a of the passage 176. FIG. 29 is a top plan view of the suction device 170 shown in FIG. 28. In order to perform the sucking operation with this embodiment, a disk 64 is placed on the suction device 170, whereon a bowl-shaped attachment 182, which communicates with a suction pump such as shown in FIG. 8 (not shown) by tube 181, is attached to the underside of the sub-turntable 171 so as to cover the aperture 176a as shown in FIG. 30(a), and the pump is operated to suck out air from the suction space 14. Upon completion of the sucking operation, the attachment 182 is disengaged from the sub-turntable 171 to close the check valve 177 as shown in FIG. 30(b), allowing the disk 64 to say sucked. The sub-turntable 171 is now ready to be mounted on a turntable 183 for reproduction of the disk 64 as shown in FIG. 30(c).

The aperture 176a may be formed at the periphery of the sub-turntable instead of at the underside thereof as in the above embodiment.

The disk sucking operation may be facilitated with the aid of an auxiliary suction device 185 as shown in FIG. 31. The auxiliary suction device 185 is of a disk shape made of a sturdy material and formed with a protrusion 186 at its center corresponding to the center spindle. The auxiliary suction device 185 is also formed with a passage 187 therein which joins the passage 176 provided in the suction device 170. The passage 187 provides communication between the upper surface and the periphery of the auxiliary suction device 185. The passage 187 has a protruded end 191 to engage with an attachment 189 which communicates by a tube 188 with a suction pump such as shown in FIG. 8 (not shown). Further, an O-ring 192 is provided on the upper surface of the auxiliary suction device 185 around the opening of the passage 187 to provide a seal. FIG. 32 illustrates the auxiliary suction device 185 shown in FIG. 31 aiding in the suction operation.

Figure 35A:
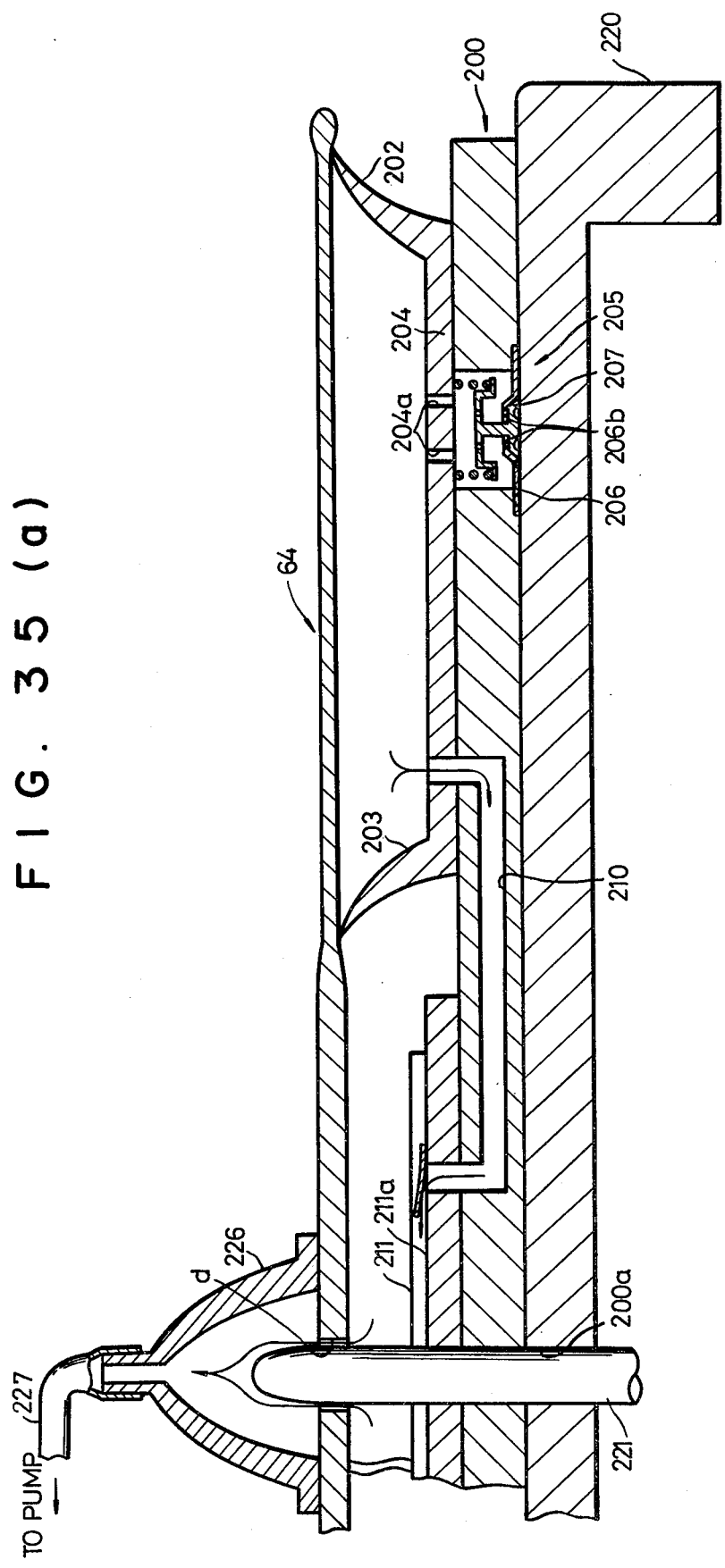

FIG. 33 illustrates a suction sub-turntable which can be removably mounted on a main turntable and is provided with a valve which is closed by the weight of the sub-turntable when the sub-turntable is placed on the main turntable and which is opened when the sub-turntable is lifted from the main turntable, disengagement of a disk from the turntable device thus being facilitated as it accompanies the lifting of the sub-turntable from the main turntable. More specifically, a base plate 201 of a sub-turntable 200 shown in FIG. 33 is of a disk shape made of a sturdy material. To the upper surface of the base plate 201 is fixedly attached an annular rubber sheet 204 formed with seal portions 202 and 203 which respectively abut the portions immediately inside the groove guard of the disk and immediately outside the label portion. A valve device 205 is provided so as to allow air into the space sealed by the seal portions 202 and 203 to release the disk from suction. The valve device 205 is shown on an enlarged scale in FIG. 34. The base plate 201 is provided with a chamber 201a while the rubber sheet 204 is formed therethrough with apertures 204a communicating with the chamber 201a. A support 206 is fixed to the bottom of the base plate 201 and formed with a hollow 206a to accommodate an actuator 207. The hollow 206a is formed with apertures 206b. The actuator 207 opens or closes the apertures 206b by a valve 207a formed at the lower end of the actuator 207. The valve 207a is made of a resilient material such as rubber and supported via a rod 207b by the support 206 so as to be vertically movable. The upper end of the rod 207b is formed with an umbrella-like portion 207c to overlap the hollow 206a of the support 206. The umbrella-like portion 207c has apertures 207e and is formed with a flange 27b at its lower end. Between the flange 207d and the rubber sheet 204, a helical spring 208 is provided so as to bias the flange 207d against the support 206. In this state, the valve 207a is apart from the follow 206a of the support 206 and the suction space above the rubber sheet 204 is in communication with the atmosphere below the base plate 201 by the apertures 204a, 207e and 206b. This is the state which the valve device 205 reaches to release a disk from suction. Upon placing the sub-turntable 200 on the main turntable, the actuator 207 is lifted against the biasing of the helical spring 208 by the weight of the sub-turntable 200 as shown by a dotted line in FIG. 34. More specifically, the valve 207a is accommodated in the hollow 206a to close the apertures 206b, thereby interrupting communicating between the suction space above the rubber sheet 204 and the atmosphere below the base plate 201. The valve device 205 in this state is ready for the disk sucking operation. Reverting to FIG. 33, a passage 210 is provided through the rubber sheet 204 and base plate 201 to guide toward the center of the sub-turntable 200 the air withdrawn from the space sealed by the seal portions 202 and 203 when the disk is rested thereon. The base plate 201 is fixedly provided at the central portion of its upper surface with a rubber sheet 211 to support the label portion of the disk. The rubber sheet 211 is formed with grooves 211a to guide the sucked air to the center of the sub-turntable 200. The rubber sheet 211 is provided with a check valve 212 for preventing a reverse-flowing of the air at the aperture of the passage 210. The sub-turntable 200 has a central opening 200a vertically formed through the rubber sheet 211 and the base plate 201 for the spindle to enter. FIGS. 35(a) and 35(b) illustrate how to operate the disk sucking operation using the suction device shown in FIG. 33. Referring to FIG. 35(a), the sub-turntable 200 is mounted on a main turntable 220 with a center spindle 2 inserted in the central opening 200a of the sub-turntable 200, whereon the valve 207a of the actuator 207 is accommodated in the hollow 206a of the support 206 by the weight of the sub-turntable 200 to close the apertures 206b of the hollow 206. A disk 64 is then placed on the sub-turntable 200 and an attachment 226 communicating with a suction pump such as shown in FIG. 8 (not shown) is attached to the disk 64 so as to cover the central portion of the disk 64. Upon operating the suction pump, the air in the space defined by the rubber sheet 204 and the disk 225 is withdrawn and introduced into the pump finding its way, as indicated by the arrows, through the passage 210, groove 211a in the rubber sheet 211, and through a gap d between the central opening of the disk 64 and the spindle 2 and thence through an attachment 226 and a suction tube 227, while the disk 64 is lowered by the atmospheric pressure to depress the seal portions 202 and 203. When a label portion 64a of the disk 64 abuts the rubber sheet 211, the operation is discontinued and the attachment 226 is removed as shown in FIG. 35(b), leaving the check valve 212 closed to prevent the sucked air from flowing backwards so that the disk 64 remains sucked for a long period of time. Upon termination of reproduction as shown in FIG. 36, the disk 64 can be released by lifting the sub-turntable 200 to cause the actuator 207 to be depressed by the spring 208 with the result that the unblocked apertures 206b of the hollow 206 allow air to flow from below the sub-turntable 200 into the space defined by the disk 64 and the rubber sheet 204 via the apertures 206b, 207e and 204a, thereby gradually lifting the disk 64 until it is finally released from suction. The disk 64 can then be easily removed from the sub-turntable 200 after placing the sub-turntable 200 back on the main turntable 220. It should be noted that, in case a main turntable and a sub-turntable can tightly fit to each other, a valve device described above can be dispensed with.

The type of disk sucking systems which, as described above, are not adapted to resume a sucking operation when necessary while a disk is being played are not enough free, during reproduction of the disk, from air leakage which could make it impossible for the turntable to securely hold the disk against them for a long period of time. Such air leakage has conventionally been compensated by operating a vacuum pump whenever the vacuum in the suction space reduces. That method, however, suffers from disadvantages of necessitating such control system that operates the vacuum pump upon reduction of the vacuum in the suction space. Operation of the vacuum pump during reproduction of a disk, moreover, vibrates the disk, thus reducing the signal-to-noise ratio on the reproduced signal. Besides, where air is evacuated upwardly of or toward the periphery of, a disk sucking system, it is technically difficult to carry out the evacuating operation while the disk is being rotated for reproduction. It is therefore preferable that the initially obtained vacuum in the suction space be maintained for a long period of time without requiring the sucking operation to be resumed during reproduction of the disk. For example, an attempt may be made to keep the vacuum in the suction space at an initial level for as long as possible by setting a disk in better sealed contact with the turntable, namely, by improving the packing placed on the turntable. However, in order for an improved packing to provide good sealed contact between the disk and turntable, the disk needs to be free from scratches, dusts, etc. The attempt thus does not always prove successful. Another attempt to the same end would be to have initially created a vacuum in the suction space to such a high degree that it takes time before the vacuum in the suction space is reduced to a level normally required so that the disk may remain sucked onto the turntable for a longer period of time. This method, however, runs the risk of injuring or warping the disk.

Figure 37:
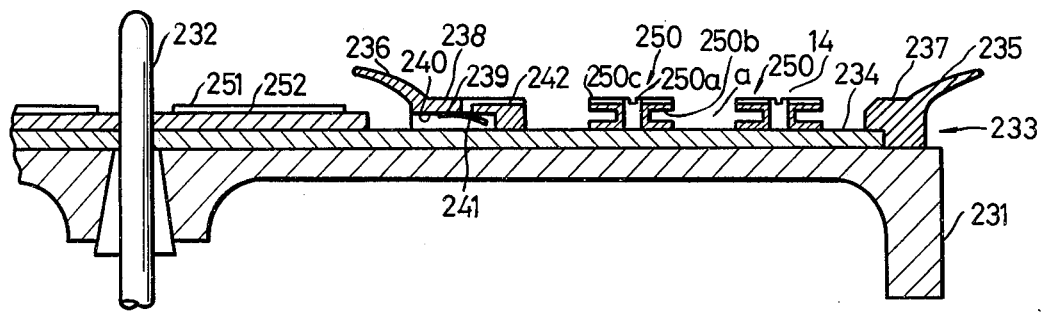
FIG. 37 is a sectional view showing another embodiment of the disk sucking system according to the invention, wherein a cavity is provided in the suction space.
Figure 39A:
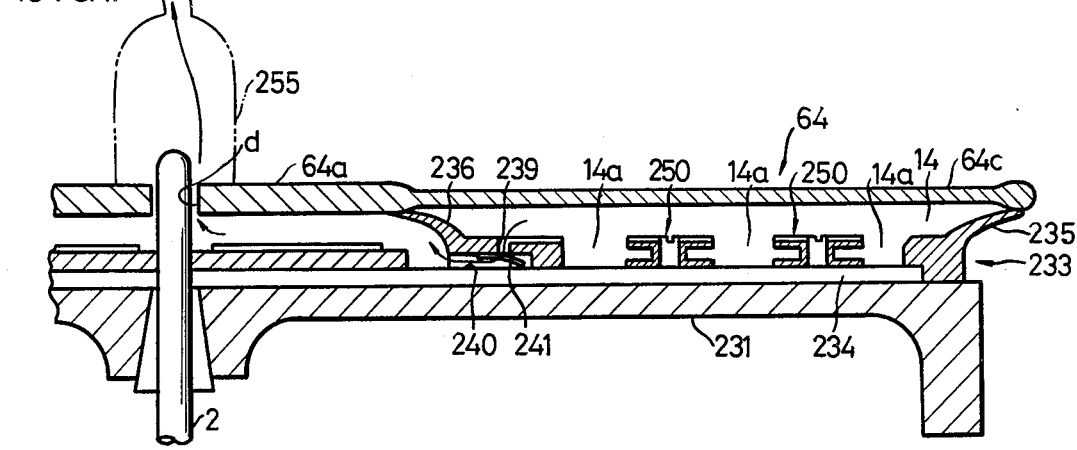
FIGS. 39(a) and 39(b) are fragmentary sectional view of the system of FIG. 37 with a disk being placed thereon for suction.
Figure 39B:
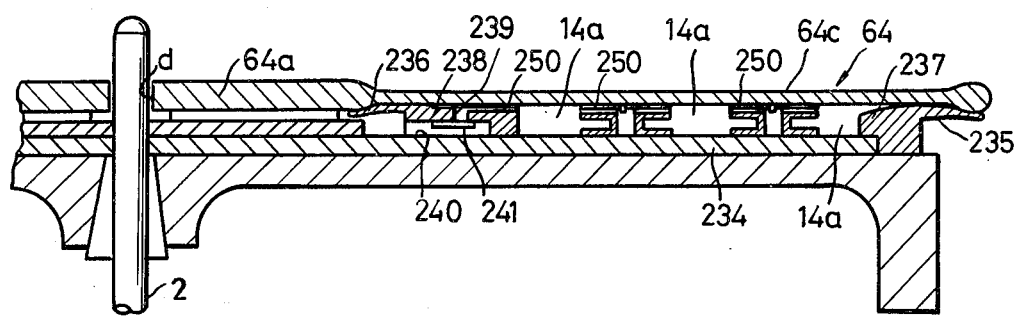
Figure 38:
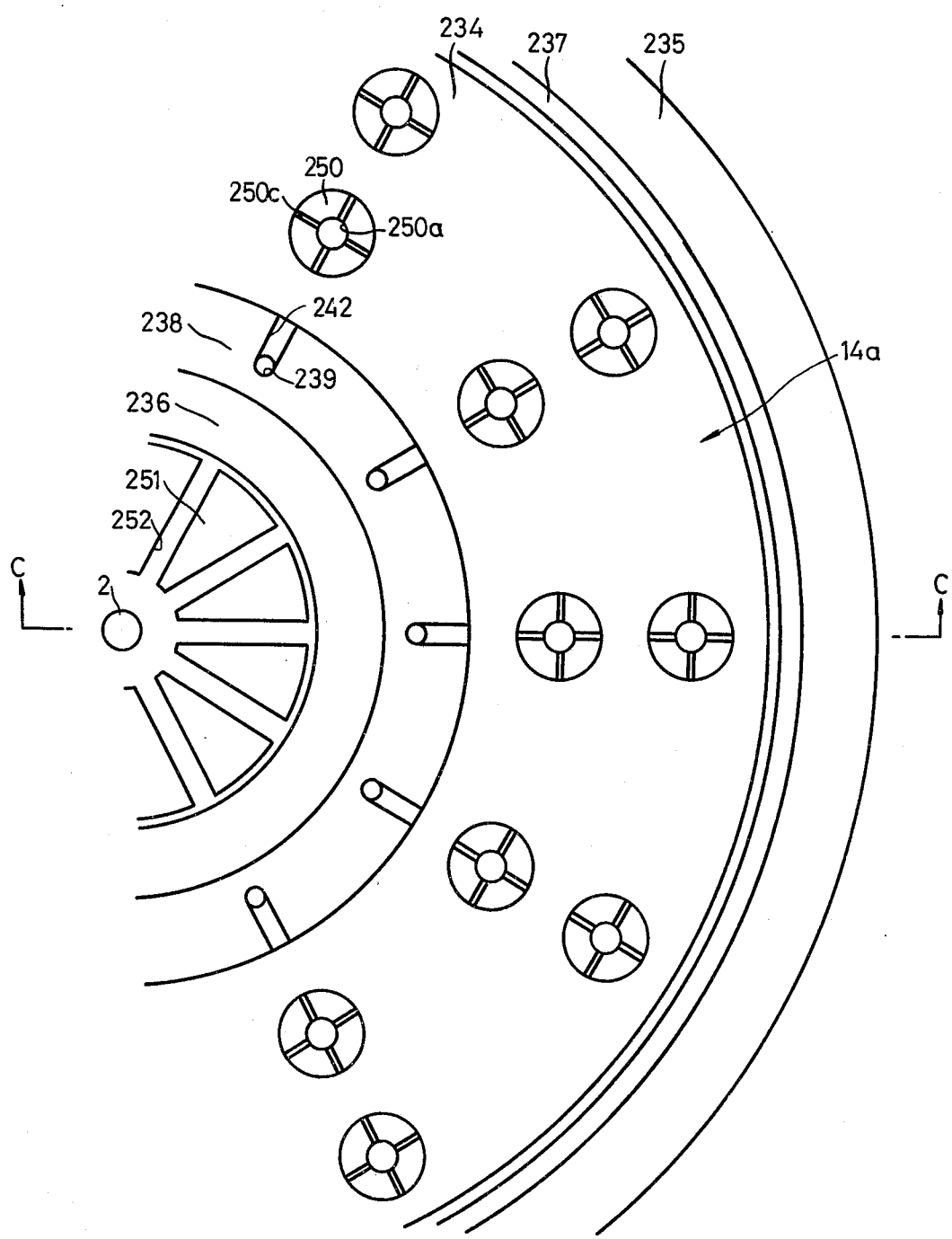
FIG. 38 is a fragmentary top plan view of the system shown in FIG. 37.

According to the present invention, a device is provided to solve the problem of such air leakage occurring during reproduction of a disk in a better, more satisfactory manner than those described above. More specifically, the device according to the invention is not aimed at prevention of said air leakage but is rather intended to allow the air pressure in the suction space to be raised by air leakage thereto, if any, at as slow a rate as possible so it may take relatively a long period of time for the disk to be freed from suction. FIG. 37, for example, shows an embodiment for carrying out such device as proposed above, wherein a turntable is so provided as to possess a cavity of a relatively large capacity between its upper surface and a disk placed thereon. The air leaking into the spacious cavity, if any, would be dispersed therein so that the pressure in the cavity would be raised by the leaking air only at a slow rate, thus enabling a disk to remain sucked for sufficiently a long period of time. In FIG. 37 a turntable device 233 is provided on a turntable 231 which is located by a center spindle 2. The device 233 comprises a metal sheet 234 which is fixedly provided with annular rubber seals 235 and 236 which respectively abut the portions immediately inside of the groove guard of a disk (not shown) and immediately outside of the label portion. These seals 235 and 236 are provided to seal up a suction space 14, which is interrupted from the atmosphere, together with the disk and act as suckers. The seals 235 and 236 formed with rims 237 and 238 respectively, which, together with the disk rested thereon, define a cavity 14a. The capacity of the cavity 14a as will be later described, is determined by factors including any amount of air that is expected to leak therein, and length of time during which a disk is required to remain sucked. The rim 238 is formed with a hole 239 and a passage 240 communicating with it, through which air withdrawn from the suction space 14 passes. Between the hole 239 and passage 240 is provided a check valve 241 which is closed to prevent air from flowing back into the suction space 14 while the disk is drawn toward the turntable by suction. Grooves 242 which communicate with the hole 239 are provided on the rim 238 so that air from the suction space 14 may be evacuated therethrough while the disk is rested on the rim 238. In the cavity 14a is annularly arranged a plurality of sustainers 250 spaced at regular intervals as shown in FIG. 38. The sustainers 250 are provided to sustain the grooved portion of the disk from below so that the disk may not be warped while the disk is drawn toward the cavity 14a by sucking. The sustainers 250 are therefore of about the same height as the rims 237 and 238. The sustainers 250 are of such a form as to occupy the least space possible in the cavity 14a. For example, each of the sustainers 250 may be of a columnar shape having a hole 250a along its axis and an annular cut 250b on its periphery as shown in FIG. 37. Atop each of the sustainers 250 are formed channels 250c to provide communication between the holes 250a and the cavity 14a. On the upper surface of the metal sheet 234 is fixedly provided with a rubber sheet 251 surrounded by the seal 236 and is formed with grooves 252. The grooves 252 are provided to prevent occurrence of difficulty in the evacuation of air from the suction space 14 resulting from abutment of the disk against the upper surface of the rubber sheet 251. The grooves 252 thus serve to guide the air evacuated from the suction space 14 to the periphery of the spindle 2. FIG. 38 is a top plan view of the turntable device shown in FIG. 37 which in turn is a sectional view taken along line C-C in FIG. 38. The sustainers 250 are spaced almost at regular intervals. In order to carry out the sucking operation with the turntable device illustrated in FIG. 37, a disk 64 is placed on the turntable device, whereon an attachment 255 is attached to the disk 64 so as to cover the spindle 2 as shown in FIG. 39(a). Upon operating a suction pump such as shown in FIG. 8 (not shown), air is evacuated from the suction space 14 through the hole 239, passage 240 and thence through the gap d between the central opening of the disk 64 and the spindle 2 as indicated by arrows while the disk 64 is lowered due to depression of the air pressure in the suction space 14. The suction operation is completed when, as illustrated in FIG. 39(b), the seals 235, 236 are pressed down with the label portion 64a of the disk 64 rested on the rubber sheet 251 while the grooved portion 64c of the disk 64 supported by the rims 237, 238 and sustainers 250 thus defining the cavity 14a between the disk 64 and metal sheet 234. In this state, the check valve 241 is closed to keep vacuum in the cavity 14a so that the disk 64 may stay sucked during its subsequent reproduction. During reproduction, the presence of scraches, dusts, and the like on the disk 64 may allow air to leak into the cavity 14a little by little through between the disk 64 and the seals 235, 236. However, because of the relatively large capacity of the cavity 14a, elevation of the air pressure in the suction space 14 due to the air leakage tekes place only at a slow rate and, therefore, the disk can remain sucked for a sufficiently long period of time. It will be noted that grooves are provided in the rubber sheet within the suction space in the previously described embodiments so as to afford space between the sucked disk and the rubber sheet at the bottom of the suction space, just like the grooves 242 shown in FIG. 37 in order to prevent occurrence of difficulty in the evacuation of air which results from the abutment of the disk against the rubber sheet. Such grooves, however, have a small capacity and by no means perform the same function as the cavity 14a as shown in FIG. 37.

Figure 40:
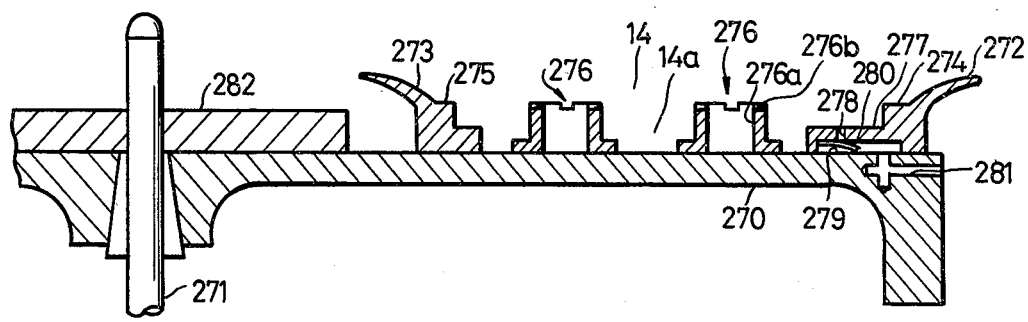
FIG. 40 is a fragmentary sectional view showing another embodiment of the disk sucking system according to the invention comprising in the suction space a cavity from which air is evacuated through the periphery of the turntable device.
Figure 41:
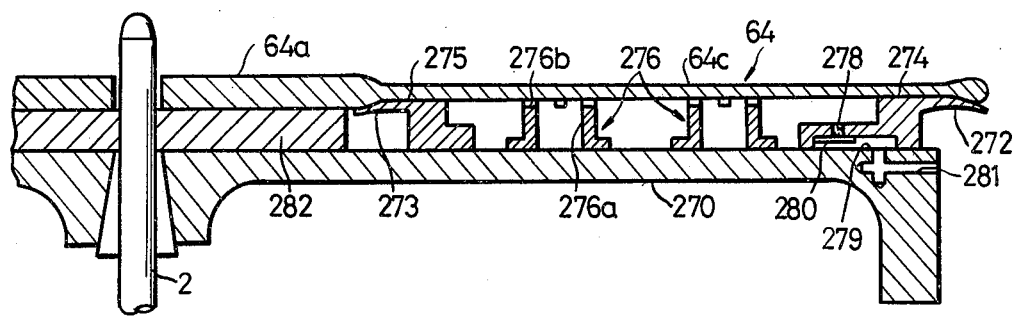
FIG. 41 is a fragmentary sectional view of the system of FIG. 40 with a disk being placed thereon for suction.

FIG. 40 shows another embodiment of the disk sucking system according to the invention, wherein air is withdrawn sidewardly. In FIG. 40, a turntable 270 located by a center spindle 2 is fixedly provided on its upper surface with annular rubber seals 272 and 273 which respectively abut the portion immediately inside of the groove guard of a disk (not shown) and immediately outside of the label portion. The seal portions 272, 273 are formed with rims 274, 275 respectively. The turntable 270 is also provided fixedly with sustainers 276 spaced annularly at about regular intervals. The rims 274, 275 and sustainers 276 define the cavity 14a together with the disk placed thereon. The sustainers 276 are cylindrical and each formed with a hole 276a therein which communicates with the cavity 14a by channels 276b provided atop each of the sustainers 276. The cavity 14a communicates with a hole 278 and a passage 279, both made in a stepped portion 277 of the rim 274. A check valve 280 is provided between the hole 278 and passage 279. The passage 279 in the stepped portion 277 communicates with the atmosphere by another passage 281 formed in the turntable 270. The air in the suction space 14 is withdrawn from this passage 281 to suck the disk. On the upper surface of the turntable 270 is fixedly provided also with a rubber sheet 282 at its central part to support the label portion of the disk. In this embodiment, the sucking operation is completed when, as shown in FIG. 41, the seals 272, 273 are pressed down with the label portion 64a of a disk 64 rested on the rubber sheet 282 and the grooved portion 64c of the disk 64 supported by the rims 274, 275 and sustainers 276, thus defining the cavity 14a between the disk 64 and the turntable 270. In this state, the check valve 280 is closed to keep vacuum in the cavity 14a so that the disk 64 may remain sucked during its subsequent reproduction. While reproduction, the presence of scratches, dusts and the like on the disk 64 may allow air to leak into the cavity 14a little by little through between the disk 64 and the seals 272, 273. However, because of the relatively large capacity of the cavity 14a, elevation of the air pressure in the suction space 14 takes place only at a slow rate and, therefore, the disk can remain sucked for a sufficiently long period of time.

Figure 42:
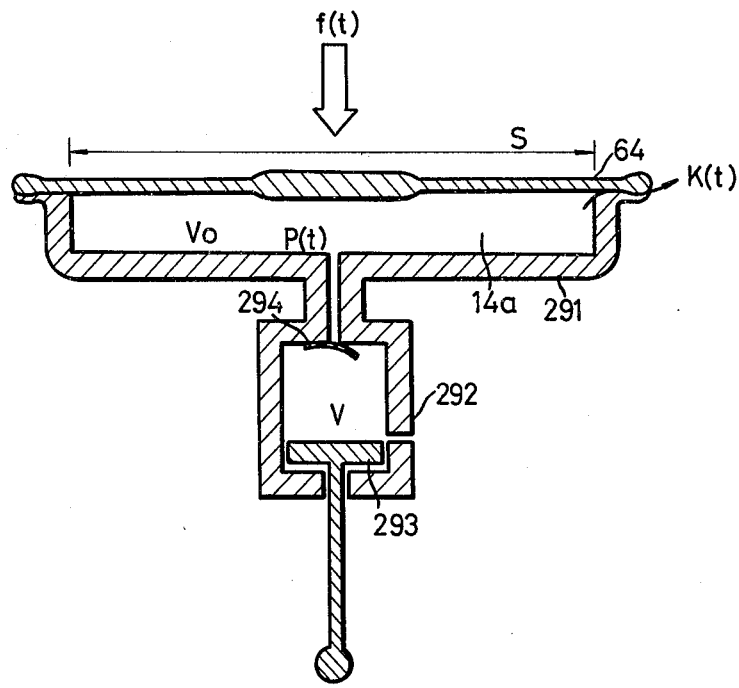
FIG. 42 is a schematic view of an embodiment of the invention with reference to which determination of the capacity of the cavity is described.

The capacity of the cavity in the turntable device made according to the invention is determined in the following manner. With reference to FIG. 42 which schematically illustrates an embodiment of the invention comprising a disk 64, turntable 291, suction pump 292, check valve 294, whereby air is evacuated from the cavity 14a by actuating a piston 293 in the suction pump 292;

Vo indicates the capacity of the cavity 14a (cm$^3$);

k(t) indicates the amount of air leaking into the cavity per unit time (cm$^3$/sec);

p(t) indicates the pressure in the cavity 14a(Kg/cm$^2$);

f(t) indicates a chucking force, i.e. force with which the disk is depressed by a pressure differential between the atmospheric pressure and the pressure in the cavity (Kg);

A indicates a chuck area, i.e. area over which the chucking force f(t) is exerted (cm$^2$);

V indicates the displacement of the suction pump (cm$^3$);

and t indicates time (sec).

With the piston 293 at the end of its compressing stroke, the disk 64 is placed on the turntable 291 and then the piston 293 is pulled once to obtain the relationship:

$$k(t) = \alpha\{1 - p(t)\} \quad (1)$$

wherein $\alpha$ is a leakage constant. It will be noted from the relationship (1) that the leakage k(t) reduces as the pressure p(t) in the cavity nears the atmospheric pressure as time goes by. The leakage k(t) for a given time may be expressed by Vo/$\alpha$ which is referred to as leakage time constant T and in which Vo indicates the capacity of the cavity, i.e., $$Vo/\alpha \equiv T \quad (2)$$

The pressure p(t) can be expressed by the formula:

$$p(t) = 1 + (\beta - 1)e^{-t/T} \quad (3)$$

wherein $\beta$ indicates the initial value of the pressure p(t) while the chucking force f(t) is expressed by the formula:

$$f(t) = A(1 - p(t)) \quad (4)$$

Figure 43:
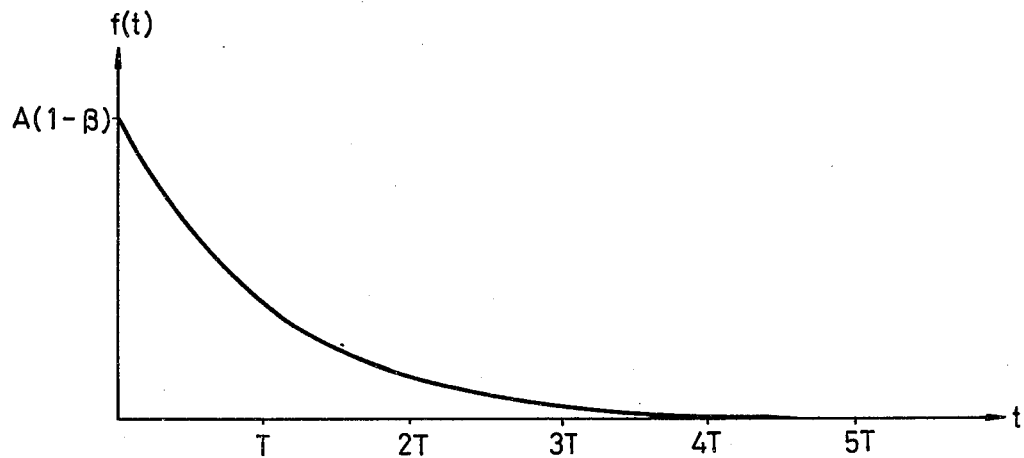
FIG. 43 is a graph showing the variation of the chucking force f(t) with time.

Substituting the right side of formula (3) for p(t) in the equation (4), the formula $$f(t) = A(1 - \beta)e^{-t/T} \quad (5)$$

is obtained. FIG. 43 shows how the chucking force f(t) varies with time t. The required leakage time constant T can be calculated from the formula (5) by measuring the chucking force f(t) against which the disk 64 is disengaged from the turntable 291; finding out the chuck area A and the initial value $\beta$ of the pressure p(t) in the cavity; and determining the time t during which the disk 64 is to remain sucked.

Further, the leakage constant $\alpha$ may be found out from formula (1) if the initial leakage k(O) and the initial pressure P(O) (p(O)=$\beta$) are known.

With the leakage time constant T and the leakage constant $\alpha$ thus obtained, the capacity $V_o$ of the cavity necessary to keep the disk 64 sucked for a period t can be calculated from the formula (2).

By way of example, a capacity $V_o$ of the cavity 14a is now determined for the turntable 291 with its outer and inner annular seals having respective diameters of 28 cm and 10 cm to maintain suction of the disk 64 for a period of 3000 seconds, with V=$V_o$, the leakage k(O)=1/60 cm$^3$/sec and the chucking force f=100 Kg against which the disk 64 is set free from suction.

The chuck area A and the initial value $\beta$ of the pressure p(t) are calculated as follows:

$$A = \frac{\pi}{4}(28^2 - 10^2) \approx 540 \text{ (cm}^2\text{)}$$

$$= \frac{V_o}{V_o + V} = \frac{V_o}{V_o + V_o} = 0.5$$

Substituting for A, $\beta$, f, and t in formula (5) the values 540, 0.5, 100 and 3000 respectively, leakage time constant T is obtained as follows:

$$100 = 540(1 - 0.5)e^{-\frac{3000}{T}}$$

$$T = -\frac{-3000}{\log\frac{100}{270}} \approx 3000$$

while the leakage constant $\alpha$ is obtained from the formula (1) as follows:

$$\frac{1}{60} = \alpha(1 - 0.5)$$

$$\alpha = \frac{1}{30}$$

With T and $\alpha$ thus found, $V_o$ can now be calculated as follows:

$$\frac{V_o}{\frac{1}{30}} = 3000$$

$$V_o = 100 \text{ (cm}^3\text{)}$$

It follows therefore that, in order to maintain suction of a disk for a period of 3000 seconds, a cavity of 100 cm$^3$ or more is necessary for the turntable 291 specified above.

Since the chuck area A practically does not much vary from one turntable device to another and the time during which a disk needs to remain sucked does not show a wide range, nor the initial value $\beta$ of the pressure p(t), the leakage k(t) and chucking force f will appreciably vary from the respective values specified in the above example, a cavity with a capacity $V_o$=100 cm$^3$ or more will be sufficient in most cases.

While a long suction of a disk is thus enabled, despite air leakage, by formation of a cavity as mentioned above, it may alternatively be ensured by the following sealing arrangement.

Figure 44:
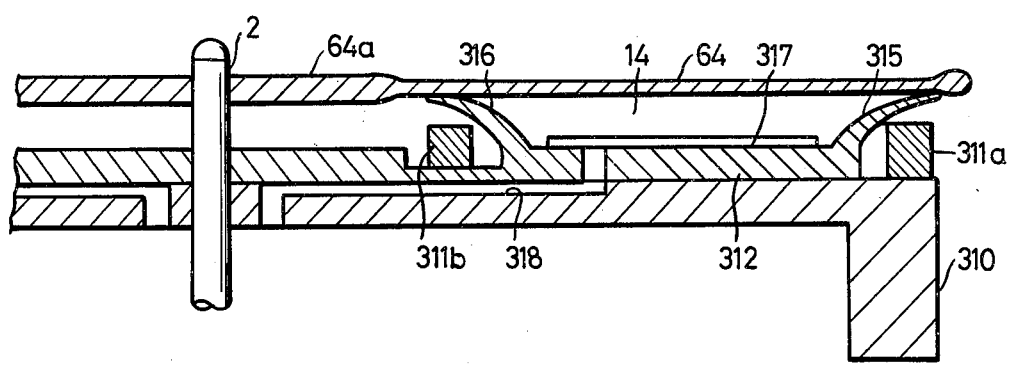
FIG. 44 is a fragmentary sectional view showing another embodiment of the disk sucking system according to the invention wherein resilient annular support members are provided to enhance the sealing ability of the annular seal portions.
Figure 45:
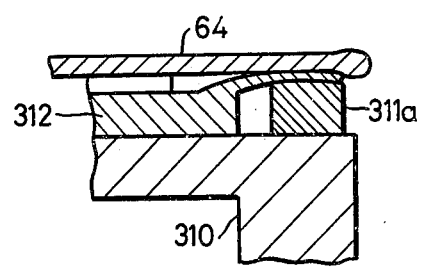
FIG. 45 is a fragmentary section of the system of FIG. 44 with a disk being sucked thereby.
Figure 46:
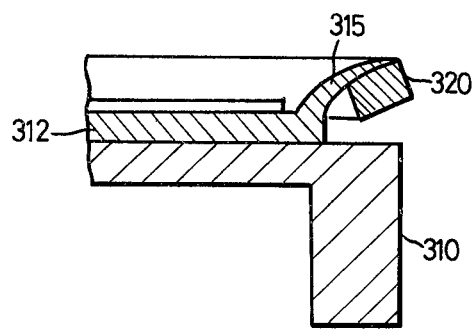
FIGS. 46 through 49 are fragmentary sectional views showing variations of the resilient annular support members provided to enhance the sealing ability of the annular seal portions.
Figure 47:
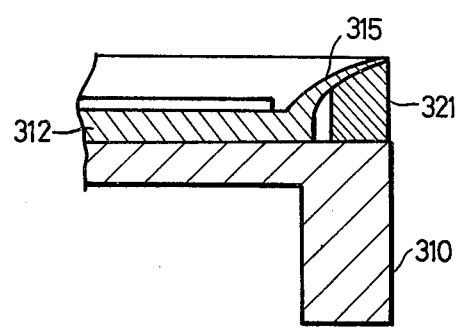
Figure 48:
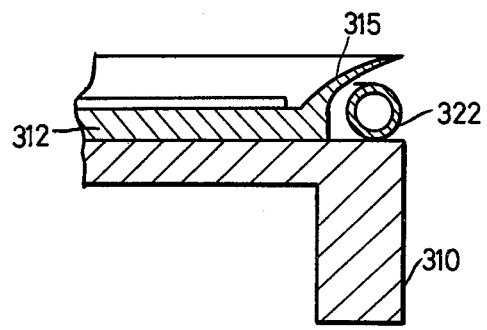
Figure 49:
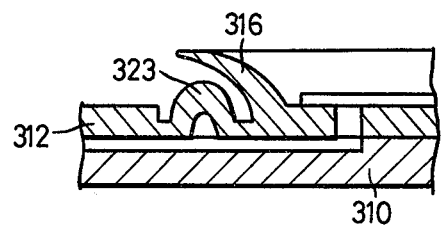
Figure 50:
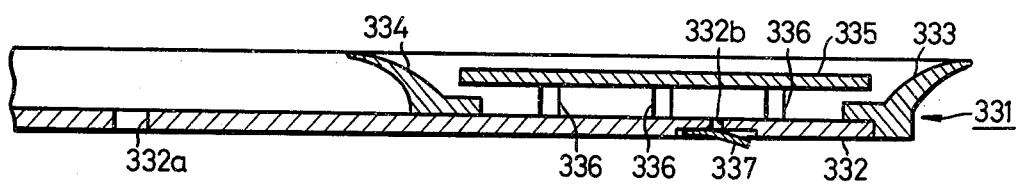
FIG. 50 is a fragmentary sectional view of another example of the subturntable wherein an annular sheet is provided in the suction space.
Figure 51:
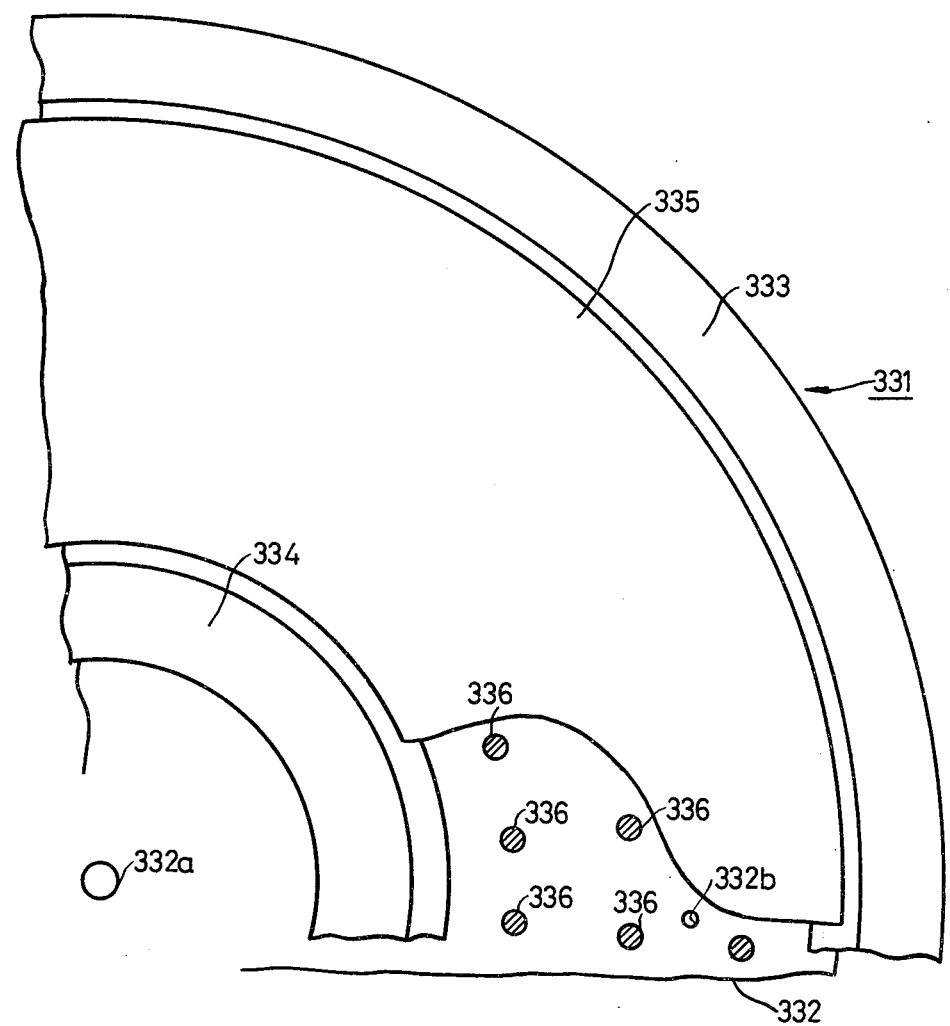
FIG. 51 is a partially sectional fragmentary top plan view of the sub-turntable shown in FIG. 50.
Figure 52A:
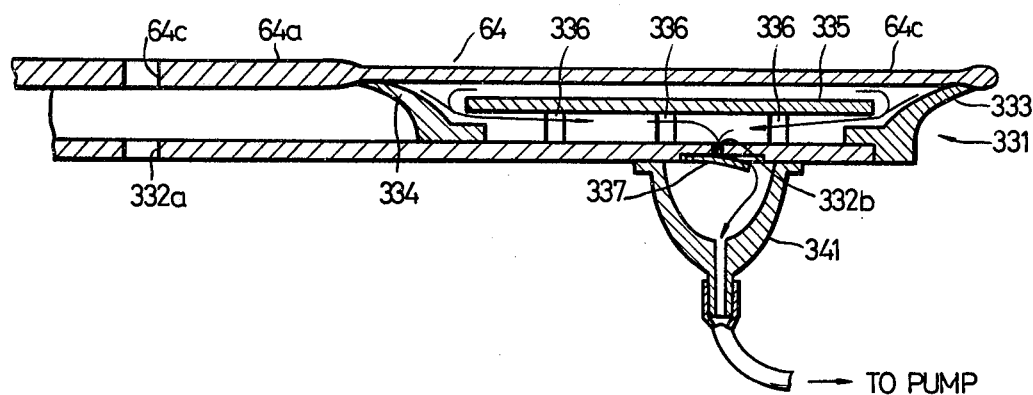
FIGS. 52(a) and 52(b) are sectional views of the sub-turntable of FIG. 50 with a disk being placed thereon for suction.
Figure 52B:
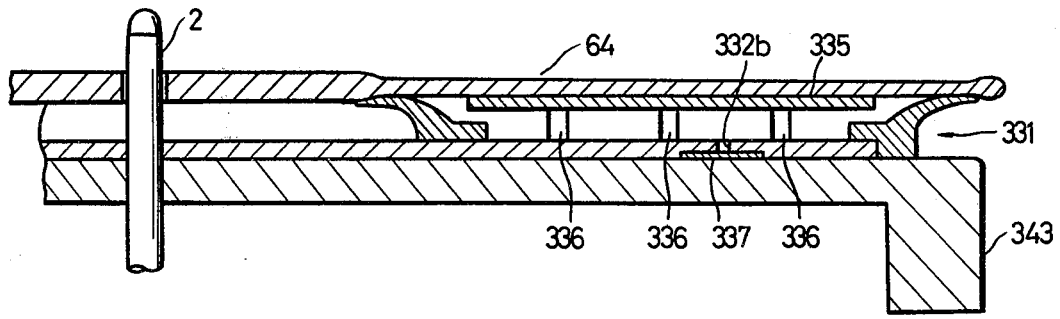
Figure 53:
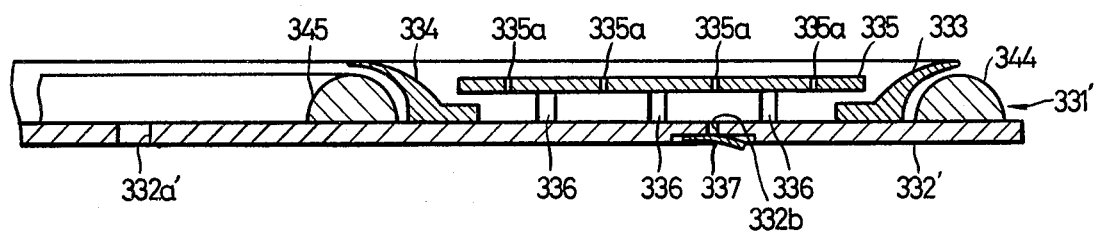
FIG. 53 is a fragmentary sectional view showing a variation of the sub-turntable shown in FIG. 50.
Figure 54:
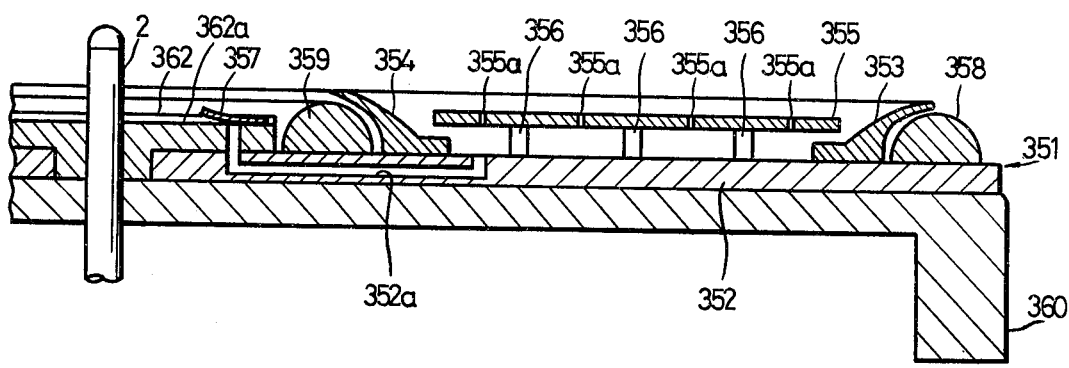
FIG. 54 is a fragmentary sectional view showing a variation of the subturntable shown in FIG. 53.
Figure 55:
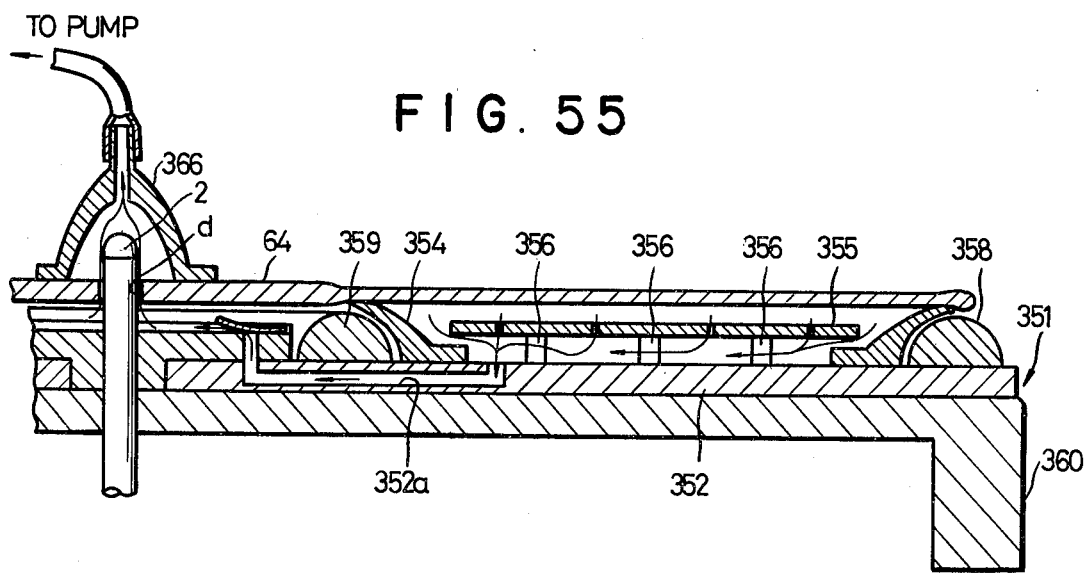
FIG. 55 is a fragmentary sectional view of the sub-turntable of FIG. 54 with a disk being placed thereon for suction.
Figure 56:
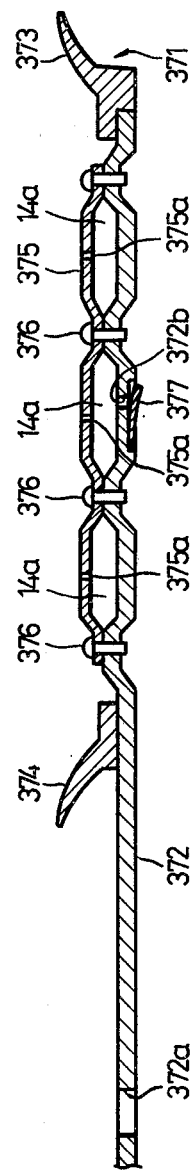
FIG. 56 is a fragmentary sectional view showing another variations of the sub-turntable shown in FIG. 50.
Figure 57:
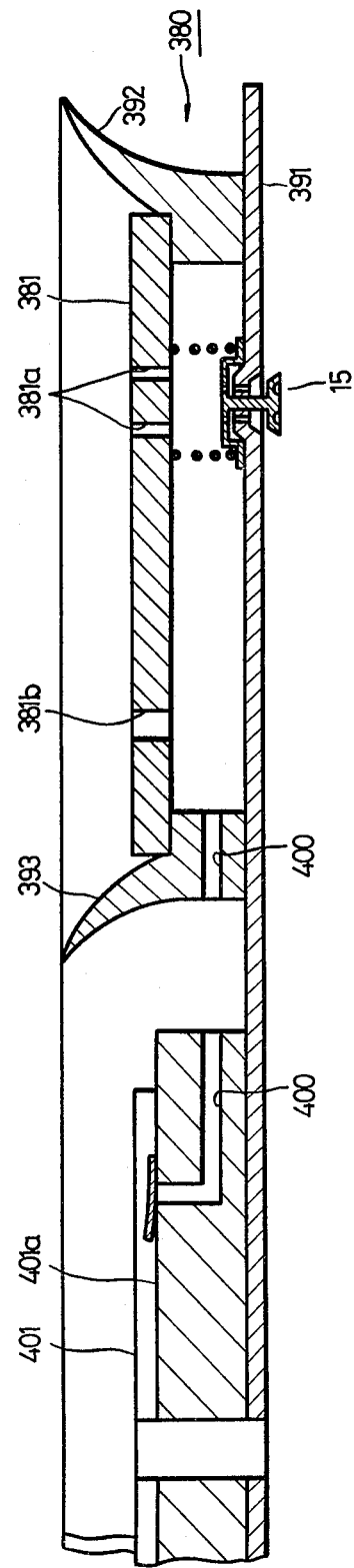
FIG. 57 is a fragmentary sectional view of still another variation of the sub-turntable shown in FIG. 50.

Referring to FIG. 1(c) to 1(d), the undesirable bend of the periphery of the seal occurring in sucking of the disk can be prevented by providing a support member of a resilient material such as rubbers between the periphery of the annular seal and the turntable. FIG. 44, for example, illustrates resilient support members 311a and 311b fixedly provided on a turntable 310 and sub-turntable 312 respectively. The sub-turntable 312 is mounted on the turntable 310 and located by a center spindle 2. The sub-turntable 312 is formed with soft rubber liplike seal portions 315, 316 so as to abut a disk 64 immediately inside the groove guard portion 314a and immediately outside the label portion 64a. On the upper surface of the sub-turntable 312 are provided radially extending grooves 317 surrounded by the annular seal portions 315 and 316 in order to prevent occurence of difficulty in evacuation of air from the suction space 14 sealed by the seal portions 315 and 316 upon abutment of the disk 64 against the upper surface of the sub-turntable 312. The air in the suction space 14 is discharged through passage 318. each of which has an upper end opening in the groove 317 and a lower end opening on the underside of the turntable 310. A resilient annular support member 311a made of an elastic material such as rubber or elastic foam substance is fixedly provided on the turntable 310 so as to adjacently surround the seal portion 315. A like resilient annular support member 311b is fixedly provided adjacently and surrounded by the seal portion 316 on the upper surface of the sub-turntable 312. These support members 311a and 311b serve to sustain the seal portions 315 and 316 respectively thereby to enable the seal portions 315 and 316 to closely contact the disk 64 as it is sucked. FIG. 45 illustrates the support member 311a sustaining the seal portion 315 against the disk 64 which is drawn downwardly. FIGS. 46 through 49 shows other examples of the support members according to the invention. FIG. 46 shows a resilient support member 320 fixed onto the outer wall surface of a seal portion 315 while FIG. 47 shows a resilient support member 321 fixed to both the outer wall surface of a seal portion 315 and the upper surface of a turntable 310. FIG. 48 shows a support member 322 of a tubular form made, for example, of vinyl, fixedly provided on the like portion of a turntable 310. FIG. 49, on the other hand, illustrates a support mebmber 323 integrally formed with a rubber sub-turntable 312 so as to sustain the inner seal portion 316 against a disk as it is sucked. It should be notd that those resilient support members may be provided at both or either of seal protions 315 and 316, considering the sealing ability of the seal portions 315 and 316.

Where a disk is sucked to a turntable by negative pressure, the disk is liable to be warped as it is drawn to the turntable. A device for preventing such warping of a disk will now be described. FIG. 50 shows a suction sub-turntable adapted to first suck a disk thereonto and then be mounted on a main turntable while FIG. 51 is a fragmentary sectional top plan view of the sub-turntable shown in FIG. 50. The sub-turntable shown in FIG. 50 has an annular sheet surrounded by two concentric annular seals all provided on a base plate such that there is a space between said annular sheet and the base plate, the annular sheet being provided to support the grooved portion of the disk as it is sucked so that it may not be warped and procure as large the space as possible in order to ensure suction of the disk for a sufficiently long time. More particularly, a suction sub-turntable 331 shown in FIGS. 50 and 51 comprises a base plate 332 which is of a disk form with a central opening 332a for a center spindle to enter and which is made of a sturdy material. On the base plate 332, annular rubber seals 333, 334 are fixedly provided so as to abut, as it is sucked, the disk immediately inside of its groove guard and immediately outside of the label portion respectively. An annular sheet 335 is made of a sturdy material such, for example, as metal, inorganic substances and the like. The annular sheet is located between the seals 333 and 334 and spaced from the base plate 332 by spacers 336 so as to be of a height lower than the upper end of the seals 333, 334. The annular sheet 335 is provided to support the grooved portion of the disk as it is sucked so that it may not be warped. The spacers 336, which may be, for example, of a columnar shape, serve to procure a large space to be evacuated so that suction of the disk for a long time may be ensured despite a possible air leakage. A hole 332b is provided in the portion of the base plate 332 surrounded by the seals 333, 334 to discharge air from the space defined by the base plate 332, seals 333, 334 and the disk to be sucked. A check valve 337 is provided at the lower end of the hole 332b to prevent back-flow of the evacuated air. FIG. 52 (a) illustrates the disk being sucked by the suction device shown in FIGS. 50 and 51. In order to carry out the sucking operation, a disk 64 is first placed on the suction sub-turntable 331 such that the outer and inner annular seals 333 and 334 respectively abut the portions of the disk 340 immediately inside of its groove guard and immediately outside of its label portion 64a. An attachment 341, which communicates with a suction pump such as shown in FIG. 8 (not shown), is then so connected to the underside of the base plate 332 as to cover the hole 332b. Upon operating the suction pump, air is evacuated from the space sealed by the annular seals 333, 334 and discharged through the channel indicated by arrows while the disk 64 is lowered by a pressure differential thereby to press down the annular seals 333 and 334 until a grooved portion 64c of the disk 64 abuts the annular sheet, thus completing the suction operation. The attachment 341 is then disconnected in order for the sub-turntable 331 to be mounted on the main turntable 343 with a spindle 2 inserted through the central openings 332a and 64c of the base plate 332 and a disk 64, respectively. Back-flow of air is impossible due to the check valve 337 which is closed. FIG. 53 illustrates another suction sub-turntable provided with a variation of the annular sheet shown in FIG. 50. This variation of an annular sheet 335 has a number of perforations 335a scattered all over it so that a disk can be placed in uniform contact with the annular sheet 335. The sub-turntable 331 down in FIG. 53 further is fixedly provided with annular support members 344 and 345 on a base plate 332' along annular seals 333 and 334 which are also fixedly provided on the base plate 332'. The annular support members 344 and 345 are made of a resilient material and provided to sustain the annular seals 333 and 334 against a disk as it is sucked, thus enhancing the sealing ability of the seals 333 and 334. FIG. 54 shows a turntable device of a type wherein the suction operation is performed with a suction sub-turntable 351 mounted on a main turntable 360 by evacuating air finally through the gap between the central opening of a disk (not shown) and a center spindle. The subturntable 351 shown in FIG. 54 comprises a base plate 352, outer annular seal 353, inner annular seal 354, annular sheet 355 provided with perforations 335a, spacers 356, and annular support members 358 and 359. The base plate 352 is provided with a passage 352a to guide toward a center spindle 2 the air evacuated from the space sealed by the annular seals 353 and 354. Surrounded by the inner seal 354, a rubber sheet 362 is provided on the base plate 352 to support the label portion of the disk. The rubber sheet 362 is formed with grooves 362a whereby air guided through said passage 352a is further led to the periphery of the spindle 2. The passage 352a is provided, where it opens in one of the grooves 362a with a check valve 357 to prevent backflow of the evacuated air. In order to perform the suction operation with the device shown in FIG. 54 a disk 64 is placed on the sub-turntable 351 and an attachment 366 which communicates with a suction pump such as shown in FIG. 8 (not shown) is mounted on the disk 64 so as to cover the spindle 2 as shown in FIG. 55. Upon operating the pump, air in the space sealed by the annular seals 353, 354 finds its way as indicated by arrows before it finally is sucked through the gap d between the spindle 55 and the central opening of the disk 64. FIG. 56 illustrates a suction device of a type, similar to the one shown in FIG. 50, wherein the suction operation is conducted by a sub-turntable 371 before it is mounted on a main turntable (not shown). The sub-turntable 371 comprises a base plate 372 and an annular sheet 375 both formed with dents. Each of the dents of the base plate 372 coincides with one of the dents of the annular sheet 375. The base plate 372 and annular sheet 375 are fastened to each other by means of bolts 376 passed through every coupled dents thereby define a cavity 14a. The sub-turntable 371 further comprises an outer annular seal 373, an inner annular seal 374, a hole 372b for discharging air, perforations 375a through which air is introduced from above the annular sheet 375 into the cavity 14a before discharged through the hole 372b, a check valve 377 and a central opening 372a for a center spindle to enter. FIG. 57 illustrates a suction sub-turntable 380 wherein a valve drive 15 such as shown in FIG. 34 is incorporated. More particularly, in the suction subturntable 380 shown in FIG. 57, an annular sheet 381 has apertures 381a for allowing air into the space sealed by annular seals 392 and 393 to set a sucked disk free from suction, and a hole 381b for letting air out of the space sealed by the annular seals 392 and 393 to suck the disk. In order to perform the suction operation, the sub-turntable 380 is first mounted on a main turntable (not shown), whereon the valve in the valve device 15 is closed by the weight of the sub-turntable 380. Air is then withdrawn from the space sealed by the annular seals 392 and 393 through the hole 381b, passages 400, grooves 401a and a rubber sheet 401, and thence through the gap between the center spindle and the central opening of the disk, thus conducting the disk sucking operation. The disk can be set free from suction by bodily lifting the sub-turntable 380, thereby opening the valve of the valve device 15 to allow air into the space sealed by the annular seals 392 and 393. In FIG. 57, reference numeral 391 designates a base plate of the seals 392 and 393, the rubber sheet 401, and the valve device 15.

What I claim is:

1. A disk player system having a vacuum function comprising:
   a turntable;
   means for driving said turntable;
   a disk vaccuum member located on the turntable of a configuration defining a suction space between said disk vacuum member and a disk when the disk is placed on the turntable;
   means provided in said disk vacuum member for defining a suction channel which communicates with said suction space at one end and with the atmosphere about a center spindle of the turntable at the other end;
   a check valve provided in said suction channel; and
   a vacuum device capable of being detachably connected to said turntable at about said center spindle for reducing pressure in said suction space and thereby causing said disk to be drawn to said disk vacuum member, said vacuum device adapted for disconnection from said turntable when said disk is reporduced.

2. A disk player system as defined in claim 1 wherein said center spindle is formed with a second suction channel communicating with said suction channel in said disk vacuum member.

3. A disk player system as defined in claim 2 wherein said second suction channel is defined by a recess formed in said center spindle.

4. A disk player system as defined in claim 2 wherein said second suction channel is defined by an opening formed through said center spindle.

5. A disk player system as defined in claim 1 including a second suction channel communicating with said suction channel in said disk vacuum member, wherein said second channel is defined by a recess formed in said disk continuously with a central opening of said disk.

6. A disk player system as defined in claim 1 including a second suction channel communicating with said suction channel in said disk vacuum member, wherein said second suction channel is defined by perforations formed in a label portion about a central opening of said disk.

7. A disk player system having a disk vacuum function comprising:
   a turntable;
   means for driving said turntable;
   a disk vacuum member located on the turntable of a configuration defining a suction space between said disk vacuum member and a disk;
   means provided in said disk vacuum member for defining a suction channel which communicates with said suction space at one end and with the atmosphere about a peripheral portion of said disk vacuum member;
   a check valve provided in said suction channel; and
   a vacuum device capable of being detachably connected to said peripheral portion of said disk vacuum member for reducing pressure in said suction space and thereby causing said disk to be drawn to said disk vacuum member, said vacuum device adapted for disconnection from said disk vacuum member when said disk is reproduced.

8. A disk player system as defined in claim 7 wherein said turntable is formed with a second suction channel communicating with said suction channel in said disk vacuum member.

9. A disk player system as defined in claim 1 or 7 which further comprises means for defining a cavity between said vacuum member and said disk when the drawing operation by said vacuum device has been completed.

10. A disk player system as defined in claim 9 wherein said cavity is of a capacity equal to or larger than 100 cc.

11. A disk playing system as defined in claim 9 wherein said means for defining a cavity comprises disk sustaining member provided in said suction space for limiting the amount of motion of the disk toward the disk vacuum member.

12. A disk player system as defined in claim 1 or 7 wherein said disk vacuum member comprises two concentric annular seal members each made of an elastic material.

13. A disk player system as defined in claim 12 which further comprises elastic support members provided under said annular seal members.

14. A disk player system as defined in claim 1 or 7 wherein said disk vacuum member is affixed to the upper surface of said turntable.

15. A disk player system as defined in claim 1 or 7 wherein said disk vacuum member is comprised of a sub-turntable which is detachably mounted on said turntable.

16. A disk player system as defined in claim 15 wherein said sub-turntable is provided with a check valve.

17. A disk player system as defined in claim 15 wherein said sub-turntable is provided with a valve device which is normally biased to open and is closed by a weight of said sub-turntable.

18. A disk player system as defined in claim 1 or 7 wherein said vacuum device comprises an attachment for covering the end of said suction channel and a vacuum pump communicating with said attachment and the atmosphere.

19. A disk player system as defined in claim 1 wherein said vacuum device comprises an attachment for covering the end of said suction channel and a vacuum pump communicating with said attachment and the atmosphere wherein said attachment serves as a stabilizer during reproduction of said disk.

20. A disk player system as defined in claim 18 wherein a pressure sensor is provided in a channel communicating said attachemnt with said vacuum pump.

21. A disk player system having a vacuum function, comprising:
   a turntable;
   a disk vacuum platter located on the turntable, said platter configured to define a suction space with a disk which is placed on the platter, said platter including a suction channel communicating with the suction space at a first end thereof and with the atmosphere at a second end thereof;
   a check valve located in the suction channel for sealing the suction space from the atmosphere; and
   a vacuum device, configured for detachable connection to the second end of the suction channel, for creating a vacuum in the suction space to draw the disk toward said platter, wherein after said vacuum has been created the vacuum device is detached and the check valve closes to maintain the vacuum while the disk is being reproduced.

22. A vacuum player system comprising:
   a turntable;
   a vacuum platter located on the turntable, said vacuum platter configured to define a suction space between the vacuum platter and a disk when the disk is placed on the platter;
a suction channel located in the vacuum platter having a first end communicating with the suction space and a second end communicating with the atmosphere;
a vacuum source detachably connected to the second end of the suction channel, said vacuum source initially being operated to form a vacuum in the suction space to draw the disk toward the vacuum platter, said vacuum source being detached from the suction channel prior to playing the disk; and
valve means in the suction channel for sealing the suction channel and maintaining the vacuum condition in the suction space during the playing of the disk.

23. An apparatus for use in a disk player system, comprising:
a platter adapted to be supported by a turntable of the disk player system, said platter including seal portions defining a suction space with a disk when said disk is placed upon the platter, said platter including a suction channel communicating with the suction space at a first end thereof and with the atmosphere at a second end thereof; and
a check valve located within the suction channel;
wherein in operation a vacuum is created in the suction space prior to playing a disk by drawing air through the suction channel by means of a detachable vacuum source, the vacuum source is detached, the check valve is closed to maintain the vacuum and the disk is then played.

* * * * *